US012573509B2

(12) United States Patent
Shoup et al.

(10) Patent No.: US 12,573,509 B2
(45) Date of Patent: Mar. 10, 2026

(54) MICRO-REACTOR FUEL SLEEVE ASSEMBLY

(71) Applicant: Westinghouse Electric Company LLC, Cranberry Township, PA (US)

(72) Inventors: Jeffrey Shoup, Delmont, PA (US); Yuriy Aleshin, Cayce, SC (US); David M. Gross, Gibsonia, PA (US); Joshua J. Donovan, Cranberry, PA (US); Jurie J. Van Wyk, Mars, PA (US); Jeffrey M. Parks, LaJose, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 334 days.

(21) Appl. No.: 18/163,415

(22) Filed: Feb. 2, 2023

(65) Prior Publication Data

US 2024/0266078 A1 Aug. 8, 2024

(51) Int. Cl.
*G21C 3/10* (2006.01)
*G21C 3/14* (2006.01)

(52) U.S. Cl.
CPC ................. *G21C 3/10* (2013.01); *G21C 3/14* (2013.01)

(58) Field of Classification Search
CPC . G21C 3/06; G21C 3/10; G21C 3/105; G21C 3/14
USPC .......................................................... 376/451
See application file for complete search history.

(56) References Cited

U.S. PATENT DOCUMENTS

| | | | |
|---|---|---|---|
| 4,721,597 A | 1/1988 | Wachter | |
| 2023/0386689 A1 * | 11/2023 | Bischoff ............ | B23K 11/0935 |
| 2024/0101291 A1 * | 3/2024 | Cheng ..................... | B65B 7/285 |
| 2024/0266078 A1 | 8/2024 | Shoup et al. | |

FOREIGN PATENT DOCUMENTS

| | | |
|---|---|---|
| CN | 105023621 A | 11/2015 |
| TW | I869187 | 1/2025 |
| WO | 2016197807 A1 | 12/2016 |

* cited by examiner

*Primary Examiner* — Jinney Kil
(74) *Attorney, Agent, or Firm* — K&L Gates LLP

(57) ABSTRACT

Disclosed is nuclear reactor fuel rod for use in a nuclear reactor. The nuclear reactor fuel rod comprises a sleeve defining a longitudinal axis. The sleeve includes a first end portion and a second end portion. The nuclear reactor fuel rod further includes a first end cap mechanically coupled to the first end portion of the sleeve and a second end cap mechanically coupled to the second end portion of the sleeve. The second end cap is configured to slide along the longitudinal axis relative to the sleeve. The nuclear reactor fuel rod further includes a fuel compact located inside of the sleeve between the first end cap and the second end cap.

17 Claims, 20 Drawing Sheets

MICRO-REACTOR FUEL SLEEVE ASSEMBLY

GOVERNMENT CONTRACT

This invention was made with government support under Contract No. DE-NE0009050 awarded by the Department of Energy. The government has certain rights in the invention.

BACKGROUND

The present disclosure relates to nuclear micro-reactors and the placing fuel into them.

SUMMARY

In one general aspect, the present disclosure provides a nuclear reactor fuel rod for use in a nuclear reactor. The nuclear reactor fuel rod includes a sleeve defining a longitudinal axis. The sleeve includes a first end portion and a second end portion. The nuclear reactor fuel rod further includes a first end cap mechanically coupled to the first end portion of the sleeve and a second end cap mechanically coupled to the second end portion of the sleeve. The second end cap is configured to slide along the longitudinal axis relative to the sleeve. The nuclear reactor fuel rod further includes a fuel compact located inside of the sleeve between the first end cap and the second end cap.

In another aspect, the present disclosure provides a nuclear reactor fuel rod for use in a nuclear reactor. The nuclear reactor fuel rod includes a tube defining a longitudinal axis. The tube includes a first end portion and second end portion. The nuclear reactor fuel rod further includes a first end cap mechanically coupled to the first end portion of the tube and a second end cap includes an extraction tool interface feature. The second end cap is mechanically coupled to the second end portion of the tube. The second end cap is configured to move along the longitudinal axis relative to the tube. The nuclear reactor fuel rod further includes a plurality of fuel pellets located inside of the tube between the first end cap and the second end cap.

In yet another aspect, the present disclosure provides a method of inserting nuclear fuel into a nuclear reactor using a nuclear reactor fuel rod. The method includes coupling a first end cap of the nuclear reactor fuel rod to a first end portion of a sleeve of the nuclear reactor fuel rod, inserting fuel pellets inside the sleeve, and coupling a second end cap of the nuclear reactor fuel rod to a second end portion of the sleeve such that the fuel pellets are located in the sleeve between the first end cap and the second end cap. The method further includes coupling an extraction tool to an extraction tool interface feature of the nuclear reactor fuel rod and placing the nuclear reactor fuel rod inside of the nuclear reactor with the extraction tool.

BRIEF DESCRIPTION OF THE FIGURES

The novel features of the various aspects are set forth with particularity in the appended claims. Throughout the FIGS. like reference characters designate like or corresponding parts throughout the several views of the drawings. The described aspects, however, both as to organization and methods of operation, may be best understood by reference to the following description, taken in conjunction with the accompanying drawings in which:

DESCRIPTION

Figure 1:
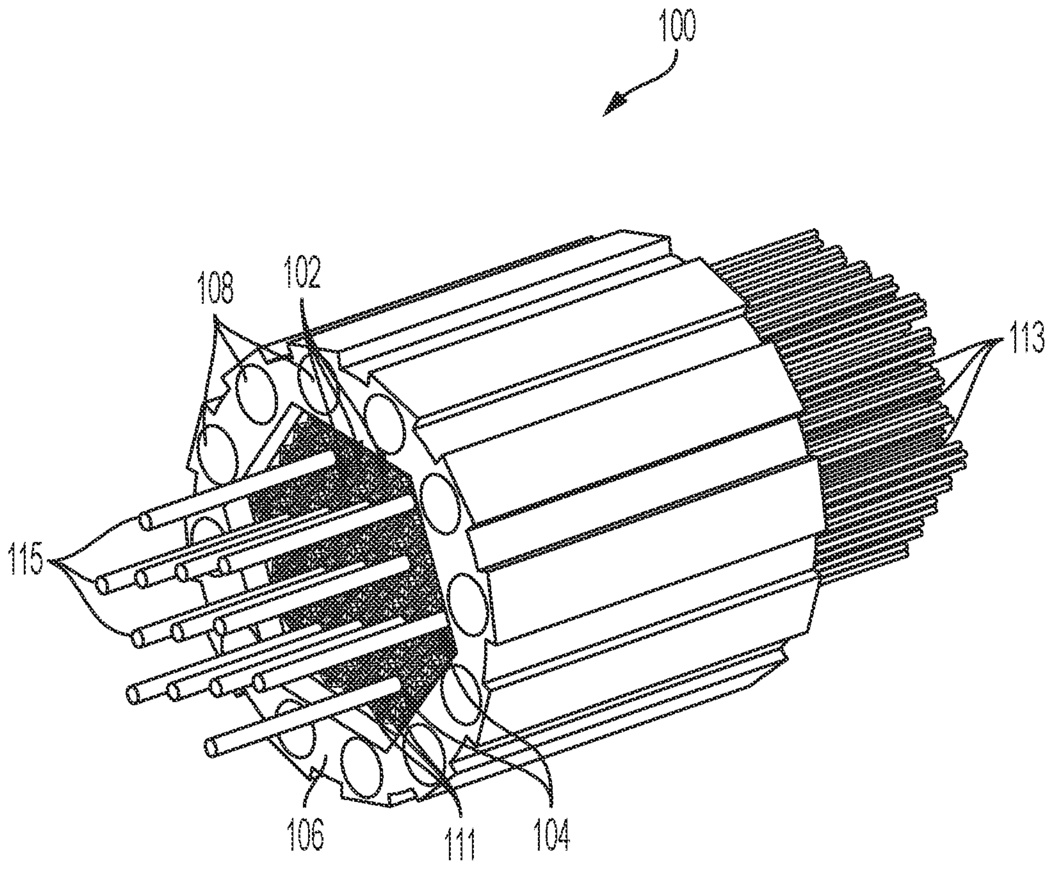
FIG. 1 is a perspective view of an example reactor core of a nuclear micro-reactor, according to at least one aspect of the present disclosure.

Numerous specific details are set forth to provide a thorough understanding of the overall structure, function, manufacture, and use of the aspects as described in the disclosure and illustrated in the accompanying drawings. Well-known operations, components, and elements have not been described in detail so as not to obscure the aspects described in the specification. The reader will understand that the aspects described and illustrated herein are non-limiting examples, and thus it can be appreciated that the specific structural and functional details disclosed herein may be representative and illustrative. Variations and changes thereto may be made without departing from the scope of the claims. Furthermore, it is to be understood that such terms as “top”, “bottom”, “forward”, “rearward”, “left”, “right”, “upwardly”, “downwardly”, and the other such words are words of convenience and are not to be construed as limiting terms.

It should be noted that the illustrative examples are not limited in application or use to the details of construction and arrangement of parts illustrated in the accompanying drawings and description. The illustrative examples may be implemented or incorporated in other aspects, variations, and modifications, and may be practiced or carried out in various ways. Further, unless otherwise indicated, the terms and expressions employed herein have been chosen for the purpose of describing the illustrative examples for the convenience of the reader and are not for the purpose of limitation thereof. Also, it will be appreciated that one or more of the following-described aspects, expressions of aspects, and/or examples, can be combined with any one or more of the other following-described aspects, expressions of aspects, and/or examples.

A nuclear micro-reactor requires fuel to operate, e.g. an abundance of TRISO fuel compacts. It can be time consuming and challenging to insert and extract these fuel compacts individually. An efficient means of insertion and extraction of these fuel compacts is sought in order to facilitate a robust efficient means to fuel, de-fuel, and re-fuel a nuclear reactor. Generally, a nuclear micro-reactor does not include fuel cladding. In this aspect, the fuel compacts are loaded as individual pieces, which necessitates loading of the fuel compacts in a non-vertical orientation in order to avoid fuel compact damage due to impact forces. This configuration does not allow for ease of fuel compact extraction for re-fueling or end-of-life processing.

One solution to this issue is to use a retention sleeve assembly, or fuel sleeve assembly, to house the fuel. This would allow for an efficient and automated process for initial fuel loading as well as refueling and end-of-life extraction. The fuel sleeve assembly includes a sleeve, or tube, an end cap for the ends of the sleeve, fuel compacts, one or more reflector rods, and a biasing member. One of the end caps will include a provision for retention and an extraction tool interface feature, which will allow for ease of removal and/or replacement of the entire fuel sleeve assembly. Additionally, a biasing member, e.g. a plenum spring, may be internal or external to the end cap, and the extraction tool interface feature design may include an external head or an internal cavity. There are multiple configurations that can be considered that meet the above description and some are described herein.

The use of a fuel sleeve assembly can provide a plurality of benefits. For example, application of the fuel sleeve assembly can minimize/optimize the amount of time needed for initial fuel loading, re-fueling, and end-of-life extraction of the fuel from a nuclear reactor core. An automated process may even be developed for insertion and extraction of the fuel sleeve assemblies. Without such fuel sleeve assemblies, extraction of spent fuel will be complicated, time consuming, and extremely expensive, requiring a one-at-a-time approach for fuel compact removal. Additionally, without a fuel sleeve assembly, slight core misalignment could cause individual fuel compacts to become stuck, or trapped within the core, further exacerbating the removal process.

The use of a fuel sleeve assembly allows for easier decommissioning of the nuclear reactor fuel. For example, the entire fuel sleeve assembly can be placed in a long term storage container. In at least one aspect, the fuel sleeve assembly also allows for simpler separation of high level and low level nuclear waste.

FIG. 1 is a perspective view of an example reactor core 100 of a nuclear micro-reactor, according to at least one aspect of the present disclosure. In this example, the nuclear micro-reactor uses heat pipes to transfer heat energy from the reactor core 100. The nuclear micro-reactor is a transportable micro-reactor that is inherently simpler, smaller, and more reliable than previous reactors due to a solid state design. There are a limited number of moving parts within the reactor core 100 and minimal required maintenance. Decay heat is removed via natural convection and radiation heat transfer.

Referring to FIG. 1, the reactor core 100 can be assembled to include fuel 111 (e.g. rods and/or stacks), heat pipes 113, and reactivity control rods 115 dispositioned throughout the plurality of unit cells 102 and reactivity control unit cells 104. Specifically, the fuel 111 can be dispositioned throughout fuel channels of one or more unit cells 102, the heat pipes 113 can be dispositioned throughout heat pipe channels of one or more unit cells 102, and the reactivity control rods 115 can be dispositioned through a reactivity control channel (not shown) of one or more reactivity control cells 104. According to some non-limiting aspects, the fuel 111 and heat pipes 113 are configured to extend the length of the reactor core 100. In other non-limiting aspects, the heat pipes 113 are configured to extend an additional length beyond the length of the reactor core 100, to facilitate downstream ex-core connections and/or equipment (e.g. power conversion systems, condensers, structural supports). This design allows the reactor core 100 to be customized for any intended application and/or user preference, which enables it to be versatile in response to customer needs. The assembled reactor core 100 design of FIG. 1 allows the fuel 111 and heat pipes 113 to be specifically configured to accommodate for any specific power requirement and/or structural configuration without having to reinvent the basic reactor core 100 design and assume the inherent development risks.

In further reference to FIG. 1, the reflector 106 can further include a plurality of control drums 108 configured to house a neutron absorptive material and a reflective material. In the event of a reactor and/or power failure, the control drums 108 can turn inward towards the reactor core 100 such that the absorptive material to shut down the reactor core 100 is turned inward. According to some non-limiting aspects of FIG. 1, the reflector 106 can further include a gamma shield configured to substantially surround a neutron shield, the reactor core 100, and its internal components 102, 104, 111, 113, 115 to further mitigate radiation.

Still referring to FIG. 1, the reactor core 100 can further include a plurality of reactivity control rods 115 configured to be dispositioned through a reactivity control cell 104 of the plurality of reactivity control cells 104. For example, the reactivity control cells 104 can include a reactivity control rod 115 or reactivity control channel similar to the fuel channels and/or heat pipe channels, but specifically configured to accommodate a reactivity control rod 115. Each reactivity control rod 115 can include a neutron absorbing material configured to slow and/or stop nuclear reactions within the reactor core 100 in the case of an emergency. The reactivity control rods 115 can collectively work to prevent the reactor core 100 from achieving a critical temperature or stop reactivity in the event of a reactor and/or power failure.

Figure 2:
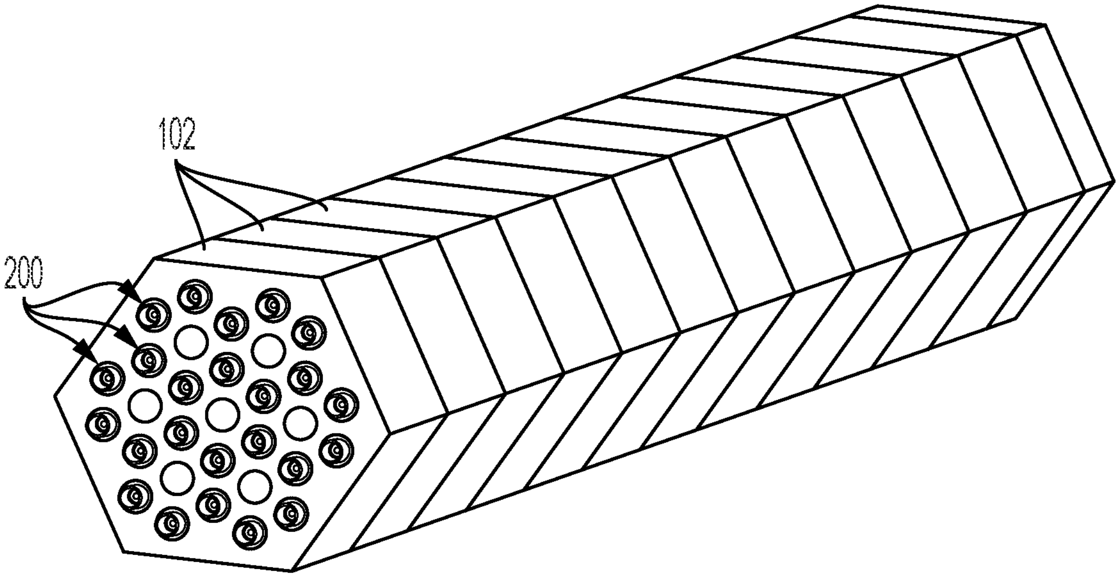
FIG. 2 is a perspective view of a plurality of unit cells in the reactor core of FIG. 1, according to at least one aspect of the present disclosure.
Figure 3:
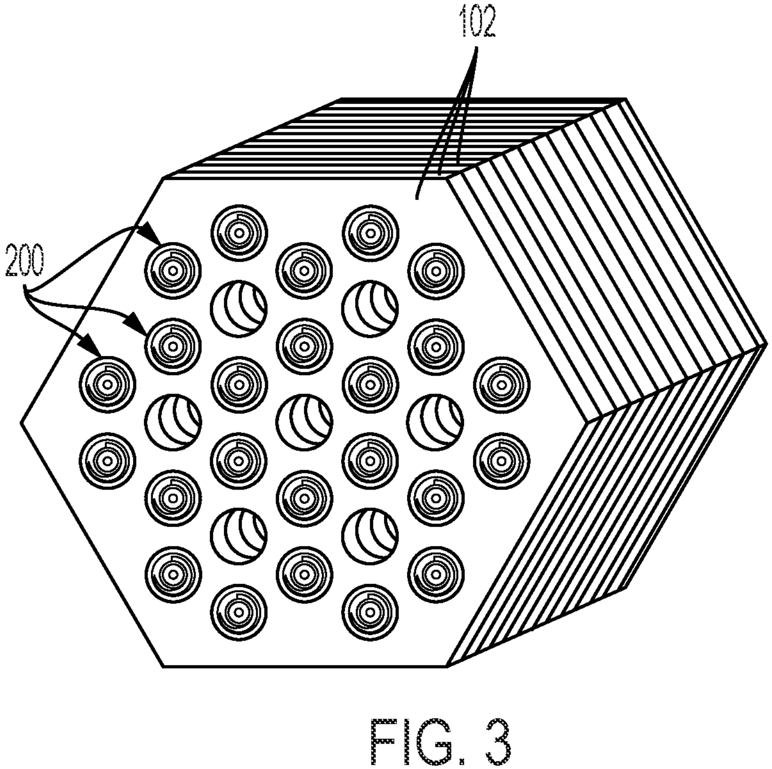
FIG. 3 is a perspective view of a plurality of unit cells in the reactor core of FIG. 1, according to at least one aspect of the present disclosure.
Figure 4:
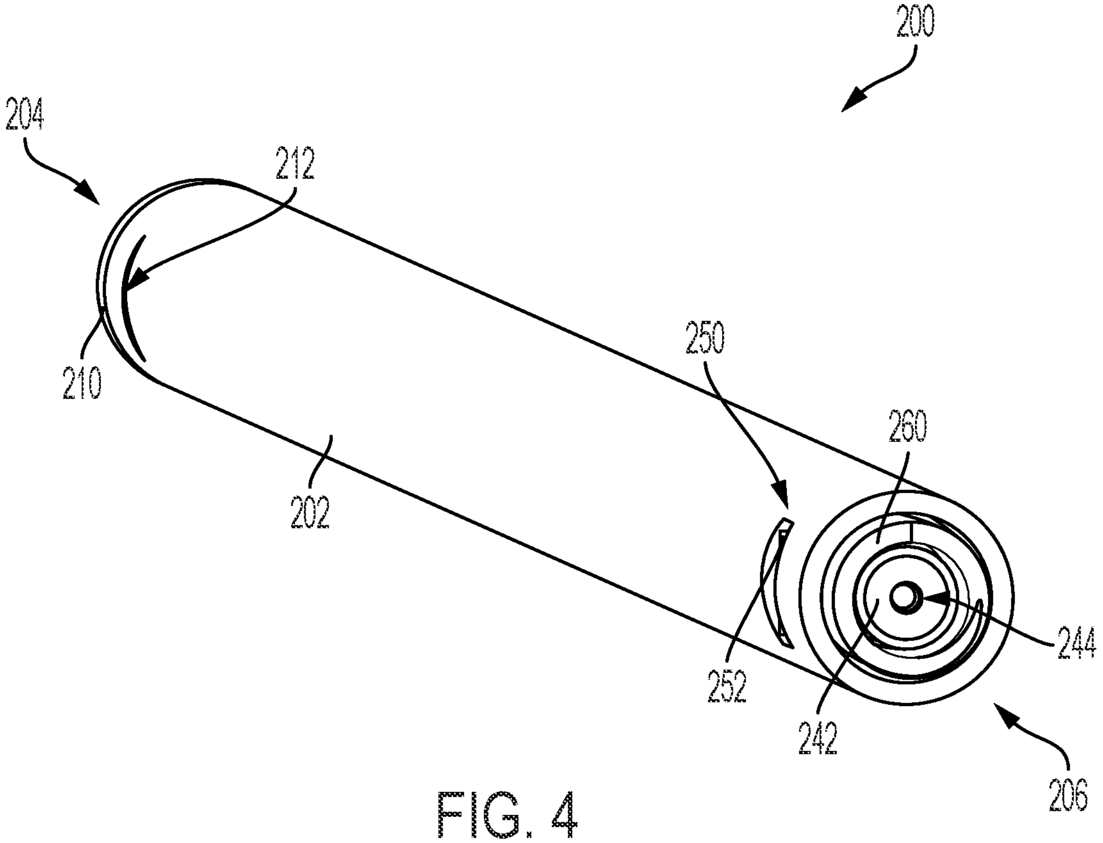
FIG. 4 is a perspective view of a fuel sleeve assembly, according to at least one aspect of the present disclosure.
Figure 5:
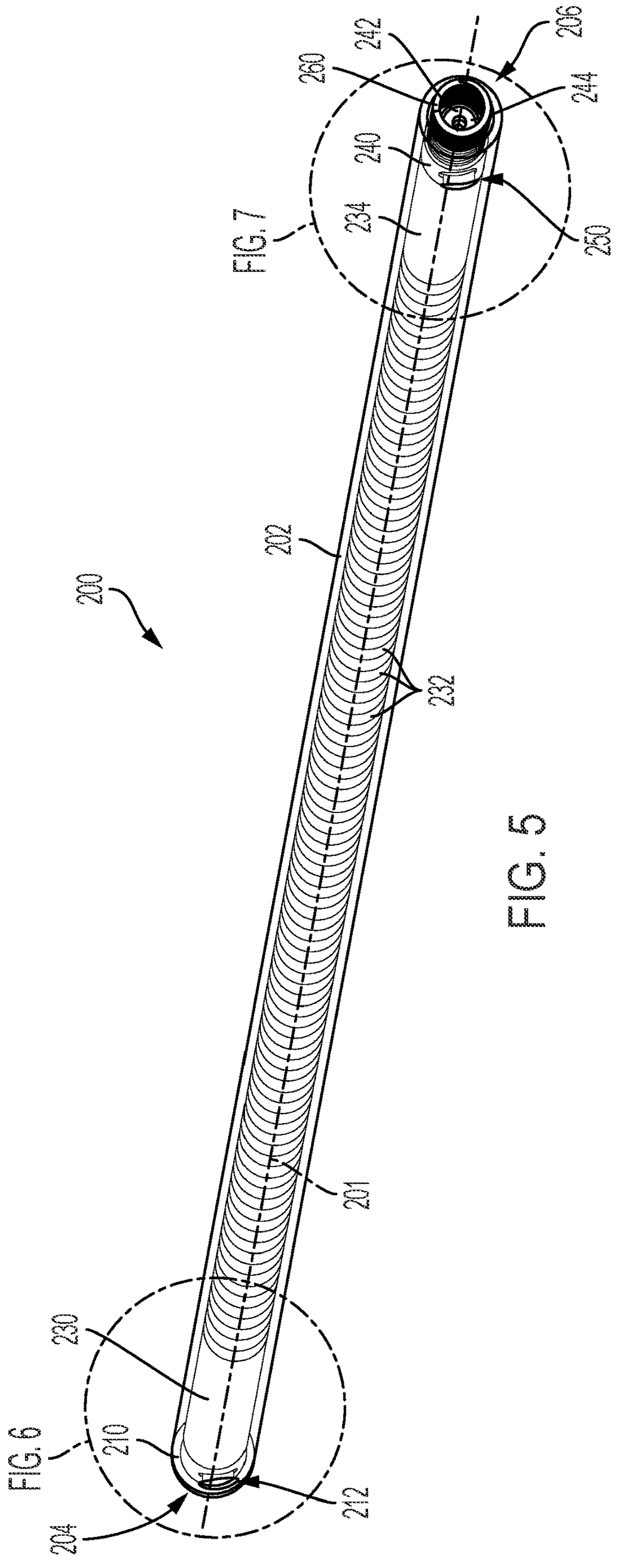
FIG. 5 is a perspective view of the fuel sleeve assembly of FIG. 4, where the sleeve is transparent, according to at least one aspect of the present disclosure.
Figure 6:
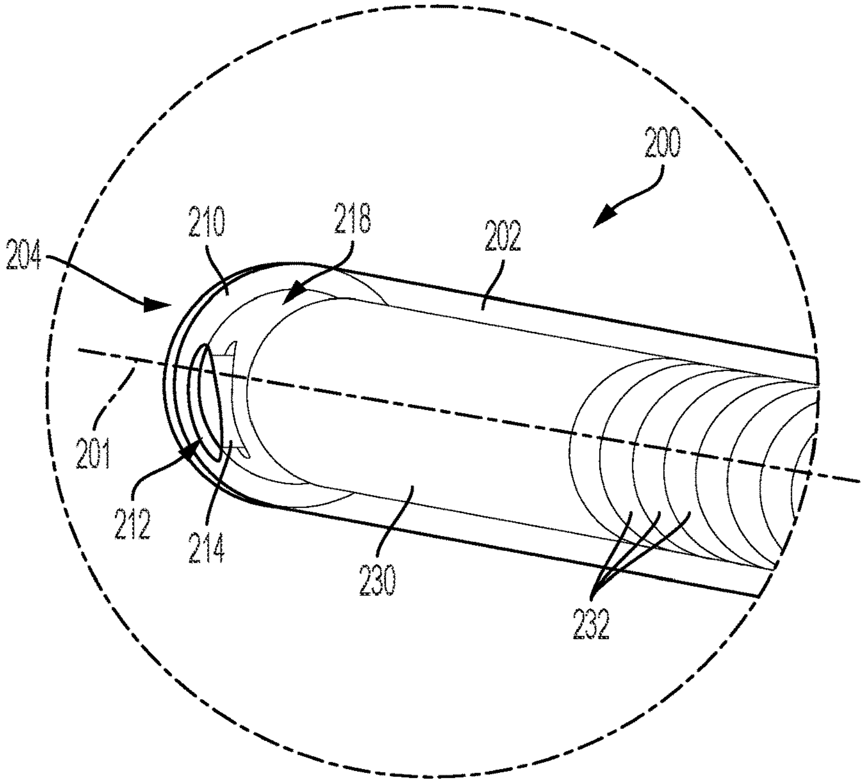
FIG. 6 is a detailed view of FIG. 5 illustrating one end of the fuel sleeve assembly, according to at least one aspect of the present disclosure.
Figure 7:
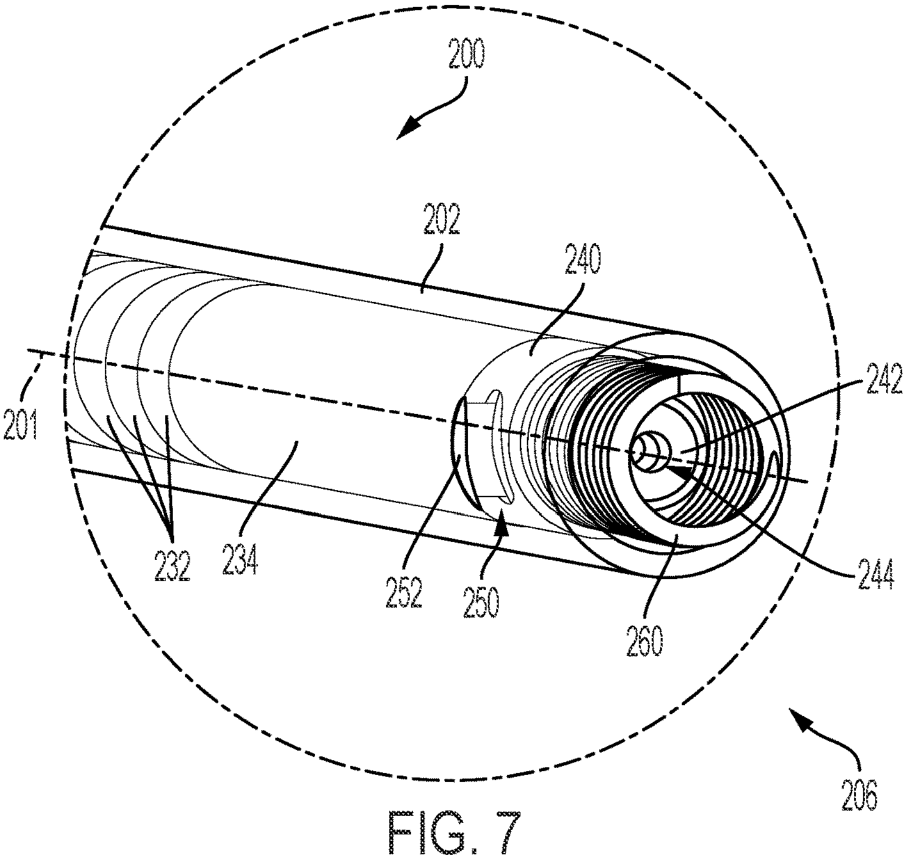
FIG. 7 is a detailed view of FIG. 5 illustrating one end of the fuel sleeve assembly, according to at least one aspect of the present disclosure.

FIGS. 2 and 3 illustrate perspective views of a plurality of unit cells 102 in the reactor core 100 of FIG. 1, according to at least one aspect of the present disclosure. The unit cells 102 are stacked the length of the reactor core 100. Fuel sleeve assemblies 200 can be inserted into the fuel channels in the unit cells 102. A nuclear fuel sleeve assembly, e.g. fuel sleeve assembly 200, can be compatible with a plurality of nuclear micro-reactors, e.g. a sodium heat pipe micro-reactor. The nuclear fuel sleeve assembly can enable reactor criticality and a cost-effective means for de-fueling and re-fueling.

As discussed above, there are multiple configurations that can be considered that meet the description of a fuel sleeve assembly. FIGS. 4-12 describe a fuel sleeve assembly 200, FIGS. 13-18 describe a fuel sleeve assembly 300, FIGS. 19-22 describe a fuel sleeve assembly 400, FIGS. 23-26 describe a fuel sleeve assembly 500, FIGS. 27 and 28 describe an external extraction tool interface feature 668, and FIGS. 29 and 30 describe an external extraction tool interface feature 768. There are more designs that could be used to describe the fuel sleeve assembly; however, they will not be discussed for the sake of brevity. One of ordinary skill in the art will understand how the different components of the different designs could be interchanged to create new or similar fuel sleeve assembly designs.

Figure 8:
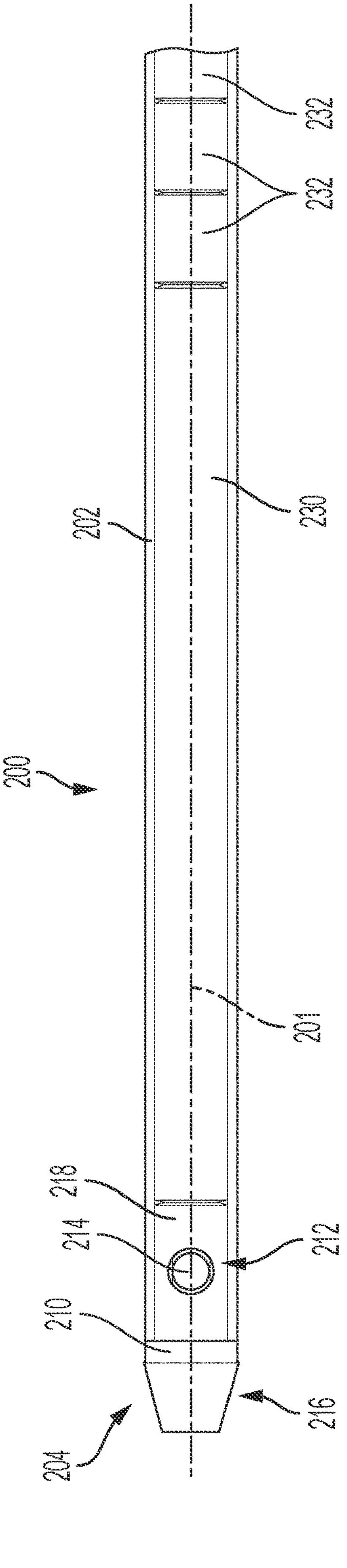
FIG. 8 is a side view of the fuel sleeve assembly of FIG. 5, according to at least one aspect of the present disclosure.
Figure 9:
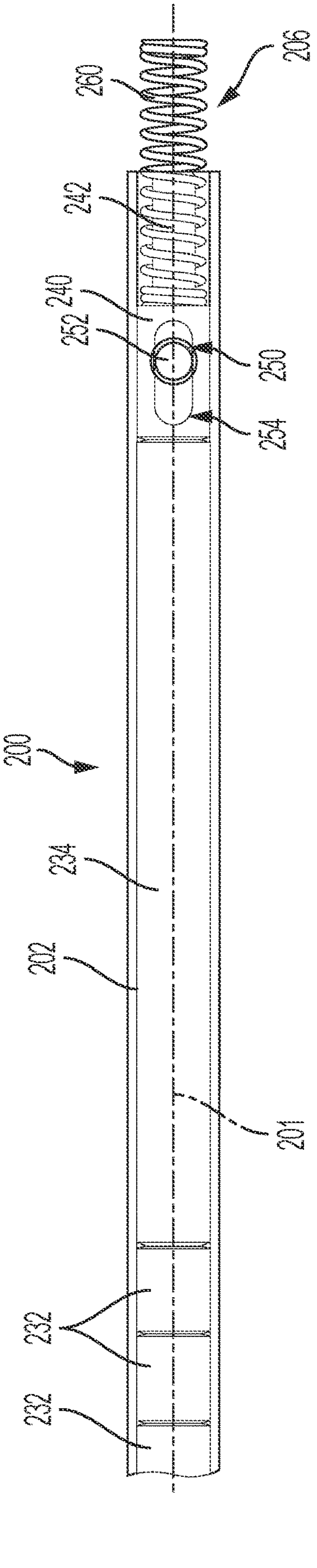
FIG. 9 is a side view of the fuel sleeve assembly of FIG. 5, according to at least one aspect of the present disclosure.
Figure 10:
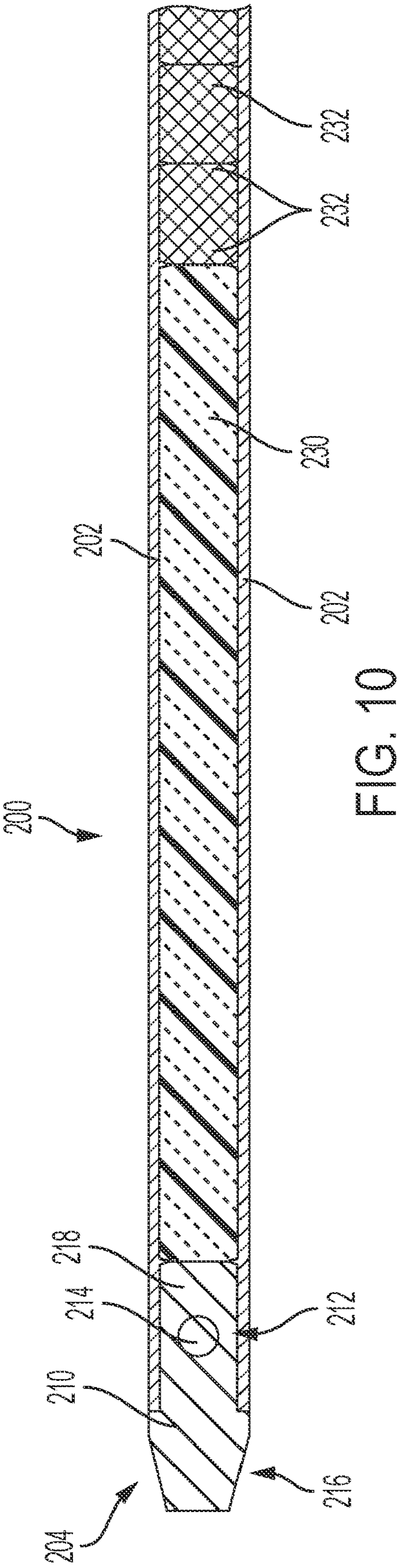
FIG. 10 is a cross-sectional view of the fuel sleeve assembly of FIG. 5, according to at least one aspect of the present disclosure.
Figure 11:
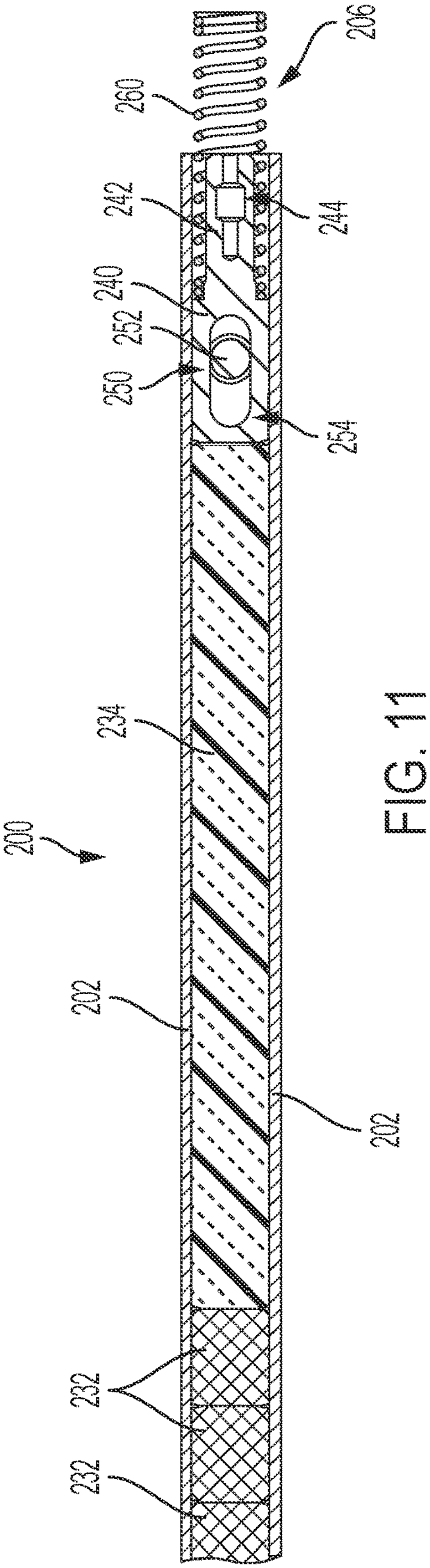
FIG. 11 is a cross-sectional view of the fuel sleeve assembly of FIG. 5, according to at least one aspect of the present disclosure.

FIGS. 4-12 illustrate fuel sleeve assembly 200. FIGS. 4-7 are perspective views, FIGS. 8 and 9 are side views, and FIGS. 10 and 11 are cross-sectional views of the fuel sleeve assembly 200, all according to at least one aspect of the present disclosure. The fuel sleeve assembly 200 comprises a sleeve 202 that extends from a first end 204 to a second end 206 defining a longitudinal axis 201. In at least one aspect, the material for the sleeve is non-metallic, e.g. a carbon fiber reinforced carbon sleeve. A non-metallic sleeve minimizes neutronic interaction and allows the core dimensions to remain essentially unchanged during operation of the nuclear reactor. The use of metallic cladding would lead to a much larger, heavier, and/or more expensive nuclear reactor.

Referring to FIGS. 5-9, the sleeve 202 is shown as transparent. The sleeve 202 houses and retains a first reflector rod 230, a plurality of fuel compacts 232, and a second reflector rod 234. For example, the first reflector rod 230, the plurality of fuel compacts 232, and the second reflector rod 234 can be inserted into the sleeve along the longitudinal axis 201. In at least one aspect, the fuel compacts 232 are TRISO pellets. The fuel sleeve assembly 200 includes a first end cap 210 and a second end cap 240 that prevent the internal components inside of the sleeve 202, e.g. the first reflector rod 230, the plurality of fuel compacts 232, and the second reflector rod 234, from exiting the sleeve 202 during operation of a nuclear reactor. In at least one aspect, the sleeve 202 prevents the fuel compacts from directly interacting with the nuclear reactor core 100.

Referring primarily to FIGS. 8 and 10, the first end cap 210 is configured to retain the reflector rods 230, 234 and fuel compacts 232 inside of the sleeve 202. In at least one aspect, the first end cap 210 has an inner portion 218 that is inserted into the first end 204 of the sleeve 202 along the longitudinal axis 201. The inner portion 218 rests against the first reflector rod 230. The first end cap 210 is mechanically coupled to the sleeve 202. In at least one aspect, the first end cap 210 is mechanically coupled to the sleeve by a retention pin 214 being inserted through a hole 212 in the sleeve 202 and inner portion 218, where the hole 212 is perpendicular to the longitudinal axis 201. For example, the hole 212 can be made in the inner portion 218 such that upon insertion of the inner portion 218 the hole 212 aligns with the hole 212 in the sleeve 202. The retention pin 214 can be placed in the hole 212 to hold the first end cap 210 in place relative to the sleeve 202. The first end cap 210 can be mechanically coupled to the sleeve 202 through a variety of methods and the retention pin connection is one such method. Another method could be for the first end cap 210 to screw into the first end 204 of the sleeve 202.

In at least one aspect, the first end cap 210 has a narrowing portion 216 that narrows the end of the first end cap away from the fuel sleeve assembly 200. In at least one aspect, the fuel sleeve assembly 200 is inserted into the nuclear reactor core 100 by the first end cap 210 entering the nuclear reactor core 100. In this aspect, the narrowing portion 216 of the first end cap 210 allows the fuel sleeve assembly 200 to easily align and slide into a fuel channel in the nuclear reactor core 100.

Referring primarily to FIGS. 9 and 11, the fuel sleeve assembly 200 has a second end cap 240 configured to retain the reflector rods 230, 234 and fuel compacts 232. In at least one aspect, the second end cap 240 inserts into the second end 206 of the sleeve 202 along the longitudinal axis 201. The second end cap 240 is mechanically coupled to the sleeve 202 and configured to slide along the longitudinal axis 201 inside of the sleeve 202. In at least one aspect, the second end cap 240 has a slot 254 cut in the second end cap 240 along the longitudinal axis 201 and the sleeve 202 has a hole 250 through the sleeve 202 perpendicular to the longitudinal axis 201. A retention pin 252 can be inserted through the hole 250 and through the slot 254. In at least one aspect, the retention pin 252 is attached to the sleeve 202. Once the second end cap 240 is mechanically coupled to the sleeve 202, the second end cap 240 can slide inside of the sleeve 202 the length of the slot 254. The second end cap

240 can be mechanically coupled to the sleeve 202 through a variety of methods and the retention pin-slot connection is one such method.

The second end cap 240 includes an end portion 242 that extends away from the second end cap 240 along the longitudinal axis 201. In at least one aspect, a biasing member 260, e.g. a spring such as a plenum spring, coil spring, a bevel spring, or etc., is attached to the end portion 242. In at least one aspect, the biasing member 260 is manufactured from carbon-carbon. In at least one aspect, when the fuel sleeve assembly 200 is outside of a nuclear reactor, the fuel sleeve assembly 200 is in an uncompressed configuration. For example, the second end cap may not apply a compressive force against the internal components of the sleeve 202. In at least one aspect, the internal components of the sleeve 202 include the first reflector rod 230, the plurality of fuel compacts 232, and the second reflector rod 234. In at at least one aspect, when the fuel sleeve assembly 200 is fully installed in a nuclear reactor, the fuel sleeve assembly 200 is in a compressed configuration. In at least one aspect, the biasing member 260 is compressed against a structure inside of the nuclear reactor.

The compression of the biasing member 260 causes the biasing member 260 to apply a compressive force to the internal components of the sleeve 202. In at least one aspect, the compressive force is due to a force applied to the second end cap 240 along the longitudinal axis toward the first end cap 210. In some aspects, the second end cap 240 may move along the longitudinal axis due to the force. The compressive force on the internal components of the sleeve 202 removes any gaps between the internal components. For example, in the compressed configuration, the biasing member 260 can be configured to apply a force to the second end cap 240 causing the second end cap 240 to slide along the longitudinal axis until it rests against the second reflector rod 234. The force applied by the biasing member 260 causes the internal components of the sleeve 202 to be compressed between the first end cap 210 and the second end cap 240. As more force is applied to the second end cap 240 toward the first end cap 210, the compressive force applied to the internal components of the sleeve 202 will increase. In some aspects, as more force is applied to the second end cap 240 toward the first end cap 210, the more the second end cap 240 will move toward the first end cap 210. In at least one aspect, the amount of compressive force that can be applied to the internal components is defined by the length of the slot 254, the biasing member 260 parameters, and the overall length of the internal components that are placed inside of the sleeve 202.

In at least one aspect, during the operation of the nuclear reactor, the internal components of the sleeve 202 can experience axial growth, e.g. thermal and neutronic-induced axial growth, making the components expand along the longitudinal axis 201. The second end cap 240 being able to slide along the longitudinal axis 201 allows the internal components of sleeve 202 to grow along the longitudinal axis 201 while maintaining the structural integrity of the fuel sleeve assembly 200. In at least one aspect, the biasing member 260 applies axial compression to the internal components allowing room for the internal components to experience axial growth.

In at least one aspect, the fuel sleeve assembly 200 is assembled by first mechanically coupling the first end cap 210 to the sleeve 202 as described above in regard to FIGS. 8 and 10. In this aspect, the internal components, e.g. reflector rods 230, 234, fuel compacts 232, etc., are then inserted into the sleeve 202 in the order desired. In this aspect, the second end cap 240 is then mechanically coupled to the sleeve as described above in regard to FIGS. 9 and 11. In at least one aspect, the first end cap 210 and the second end cap 240 prevent the internal components from exiting the sleeve 202 during operation of the nuclear reactor. Additionally, in at least one aspect, the sleeve 202 prevents the fuel compacts from directly interacting with the nuclear reactor core 100.

An automated process for removal and install of fuel sleeve assemblies can be developed. An extraction tool is used to remove and install a fuel sleeve assembly 200 in a nuclear reactor. In at least one aspect, the extraction tool is attached to a robotic arm for an automated process of removing and installing fuel sleeve assemblies 200. For example, a control circuit can be coupled to a camera and the robotic arm. In some aspects, the camera is configured to provide image data of the reactor core 100 to the control circuit. The control circuit can execute a method to automatically remove and install fuel sleeve assemblies 200. An example method is defined below of how the automated process could be performed. However, there are a plurality of methods that could be performed to complete the automated process and the method described herein is just one example.

The method includes the control circuit detecting a fuel channel on the reactor core 100. In at least one aspect, the detection of a fuel channel is based on image data from the camera. In an alternative aspect, the detection of a fuel channel is based on a sensor, e.g. a proximity sensor, pressure sensor, etc., coupled to the control circuit. The method further includes the control circuit determining if the fuel channel needs a fuel sleeve assembly 200 installed or uninstalled. In at least one aspect, the control circuit compares a location of the fuel channel to a list, or map, of fuel channels that need a fuel sleeve assembly 200 installed or uninstalled. If a fuel sleeve assembly 200 needs uninstalled, the method further includes the control circuit controlling the robotic arm to place the extraction tool over the fuel channel. The method further includes the control circuit controlling the robotic arm and the extraction tool to couple the extraction tool to the fuel sleeve assembly. For example, the control circuit could determine that the extract tool is coupled based on image data and/or based on data from a sensor in the extraction tool. The method further includes the control circuit controlling the robotic arm to remove the fuel sleeve assembly 200 by sliding it out of the fuel channel after the extraction tool is coupled to the fuel sleeve assembly 200. The method further includes the control circuit controlling the robotic arm to place the fuel sleeve assembly in a long term storage container. In some aspects, the method includes installing a new fuel sleeve assembly 200 after an old fuel sleeve assembly 200 has been uninstalled. If a fuel sleeve assembly 200 needs installed, the method further includes the control circuit controlling the robotic arm to place the extraction tool over a new fuel sleeve assembly 200. The method further includes the control circuit controlling the robotic arm and extraction tool to couple the extraction tool to the fuel sleeve assembly 200. The method further includes the control circuit controlling the robotic arm to move the fuel sleeve assembly 200 and slide the fuel sleeve assembly 200 into the fuel channel after the extraction tool is coupled to the fuel sleeve assembly 200. The method further includes the control circuit controlling the extraction tool to decouple the extraction tool from the fuel sleeve assembly 200. The method can then repeat for each detected fuel channel.

Referring primarily to FIG. 11, the end portion 242 of the second end cap 240 has an extraction tool interface feature 244. In some aspects, the extraction tool interface feature 244 can be external to the second end cap 240. For example, an end effector of the extraction tool can surround and clamp onto the extraction tool interface feature 244 to interface with the extraction tool interface feature 244. In alternative aspects, the extraction tool interface feature 244 may be an internal cavity. For example, an end effector of the extraction tool can enter the cavity and then expand to interface with the extraction tool interface feature 244. In any case, once the extraction tool interfaces with the extraction tool interface feature 244, the extraction tool can move the entire fuel sleeve assembly 200. This process allows the extraction tool to be used to move a fuel sleeve assembly 200 to either install or uninstall a fuel sleeve assemble 200 in a fuel channel of a nuclear reactor.

Figure 12:
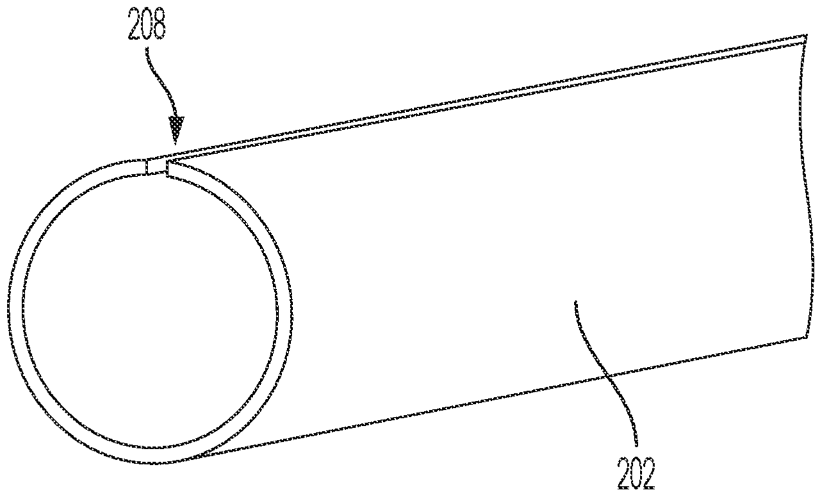
FIG. 12 is a perspective view of the sleeve of the fuel sleeve assembly of FIG. 5, according to at least one aspect of the present disclosure.

FIG. 12 is a perspective view of the sleeve 202 of the fuel sleeve assembly 200, according to at least one aspect of the present disclosure. In at least one aspect, the sleeve 202 comprises a slot 208 running the length of the sleeve 202. In this aspect, the sleeve 202 experiences stresses during operation of a nuclear reactor and the slot 208 reduces the stresses on the sleeve 202.

In at least one aspect, the fuel sleeve assembly 200 is not hermetic. For example, the internal components of the fuel sleeve assembly 200 will not be affected by any gases inside of the nuclear reactor core 100 that enter the fuel sleeve assembly 200. In some alternative aspects, the fuel sleeve assembly 200 is configured to be hermetic. In this aspect, there is an additional biasing member located inside of the sleeve 202 that is configured to compress the internal components of the sleeve 202 and allow for any axial growth of the internal components.

In at least one aspect, incorporating reflector rods and a biasing member into the fuel sleeve assembly 200 can reduce the complexity of installing and the installation time of fuel into a nuclear reactor. For example, without the fuel sleeve assembly, all the internal components of the sleeve need installed separately into a nuclear reactor. By having the internal components pre-packaged into fuel sleeve assemblies 200, the installation of fuel into a nuclear reactor can be easier and made into an automated process.

Figure 13:
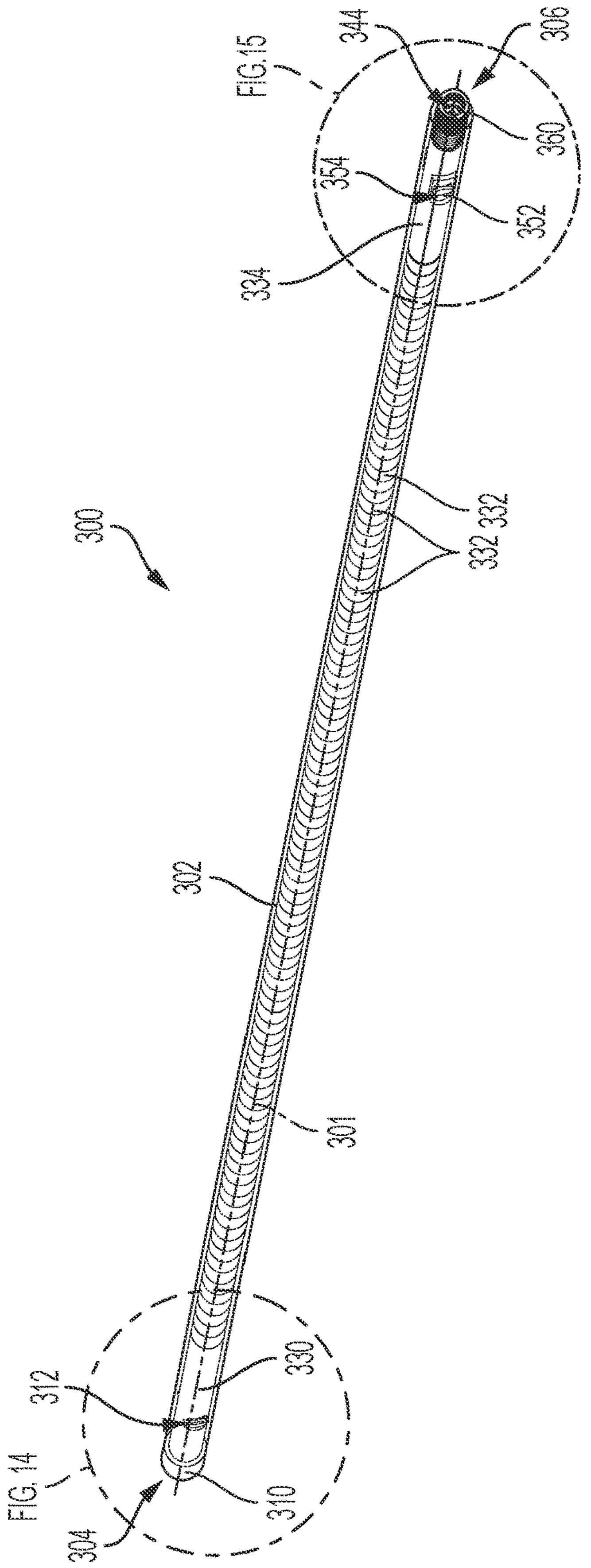
FIG. 13 is a perspective view of a fuel sleeve assembly, where the sleeve is transparent, according to at least one aspect of the present disclosure.
Figure 14:
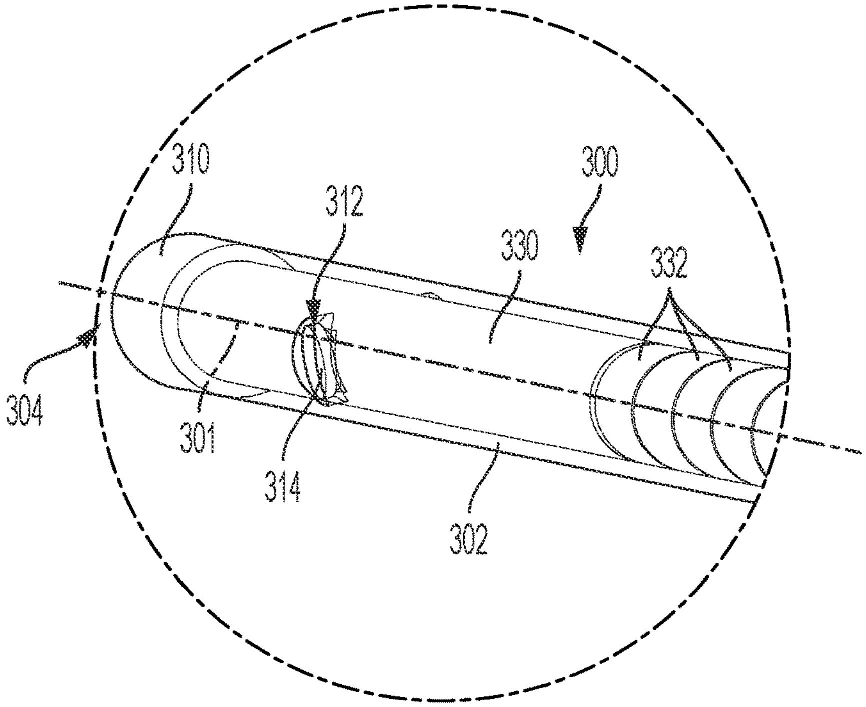
FIG. 14 is a detailed view of FIG. 13 illustrating one end of the fuel sleeve assembly, according to at least one aspect of the present disclosure.
Figure 15:
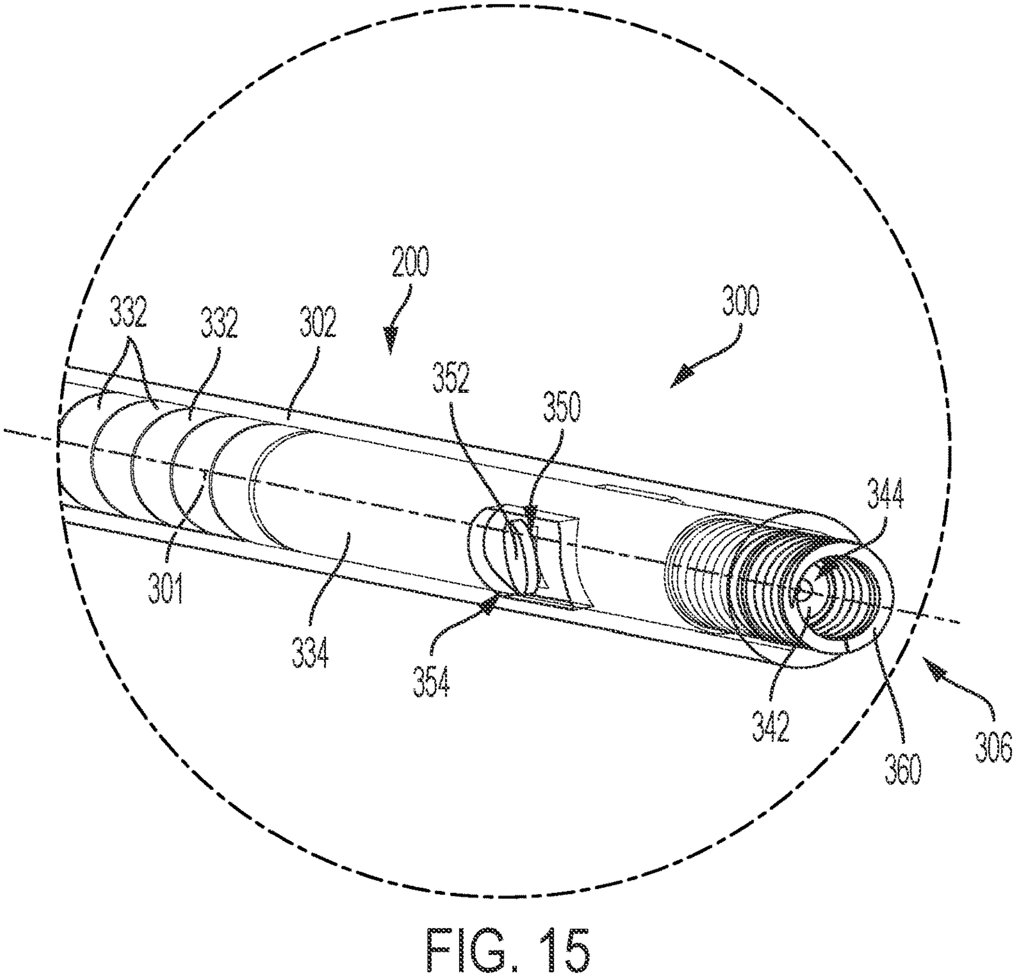
FIG. 15 is a detailed view of FIG. 13 illustrating one end of the fuel sleeve assembly, according to at least one aspect of the present disclosure.
Figure 16:
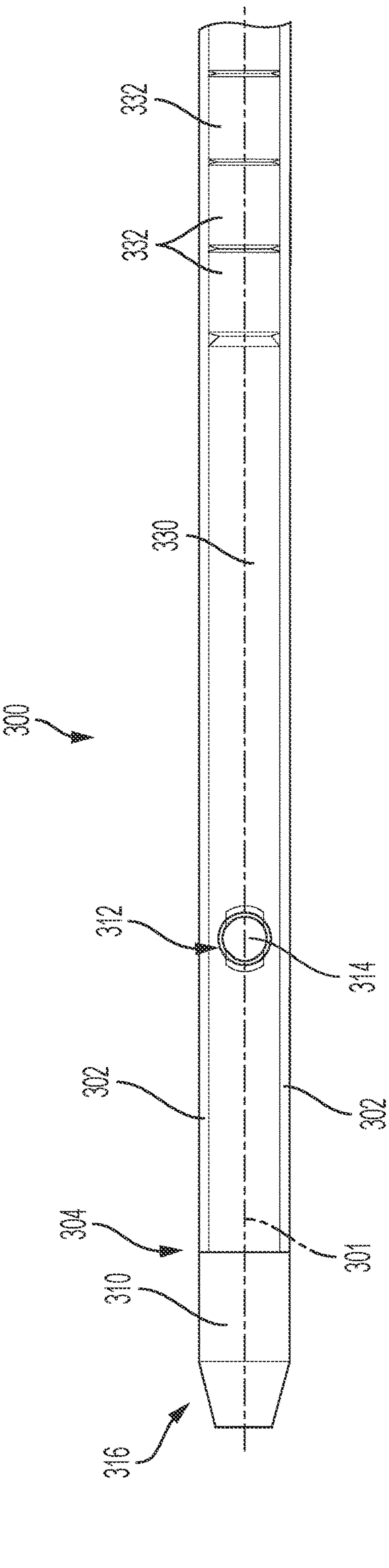
FIG. 16 is a side view of the fuel sleeve assembly of FIG. 13, according to at least one aspect of the present disclosure.
Figure 17:
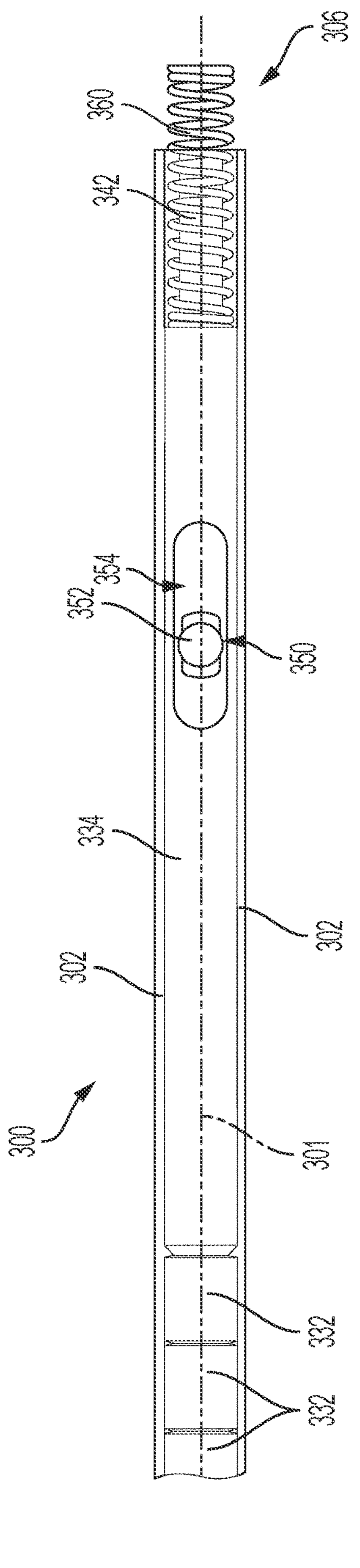
FIG. 17 is a side view of the fuel sleeve assembly of FIG. 13, according to at least one aspect of the present disclosure.
Figure 18:
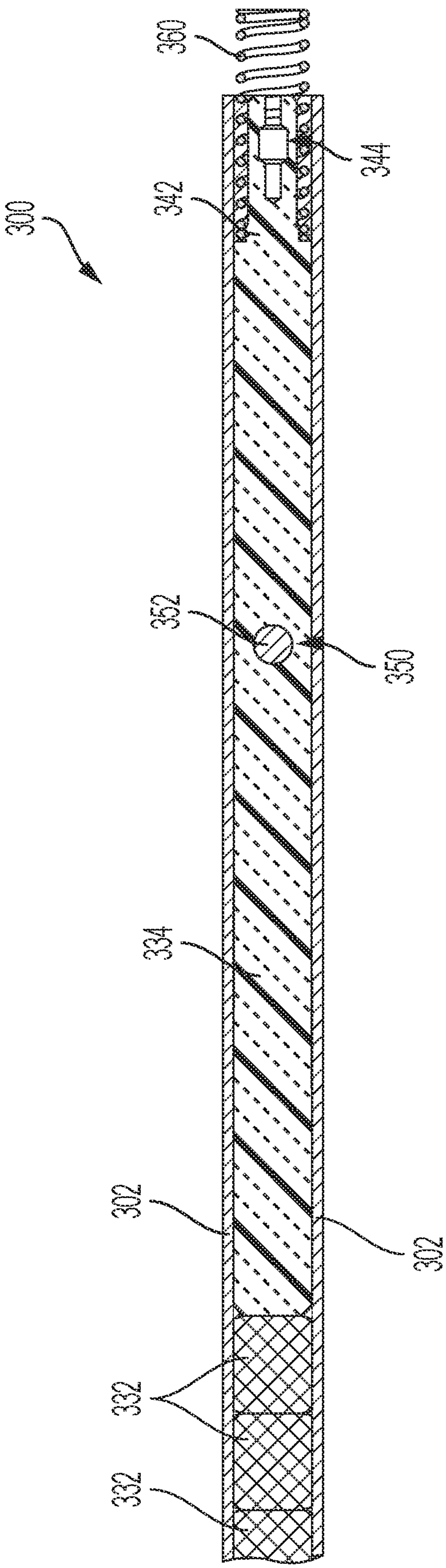
FIG. 18 is a cross-sectional view of the fuel sleeve assembly of FIG. 13, according to at least one aspect of the present disclosure.

FIGS. 13-18 illustrate fuel sleeve assembly 300. FIGS. 13-15 are perspective views, FIGS. 16 and 17 are side views, and FIG. 18 is cross-sectional views of the fuel sleeve assembly 300, all according to at least one aspect of the present disclosure. FIGS. 13-17 show the sleeve 302 as transparent. Fuel sleeve assembly 300 is similar in many respects to fuel sleeve assembly 200. For example, a sleeve 302, a first end 304, a second end 306, a longitudinal axis 301, fuel compacts 332, an end portion 342, an extraction tool interface feature 344, and a biasing member 360 of fuel sleeve assembly 300 function the same and are substantially similar to the sleeve 202, first end 204, second end 206, longitudinal axis 201, fuel compacts 232, end portion 242, extraction tool interface feature 244, and biasing member 260 of fuel sleeve assembly 200, respectively. For the sake of brevity, not all similar features and components will be discussed in detail. A main difference between fuel sleeve assembly 200 and fuel sleeve assembly 300 is that in fuel sleeve assembly 300 the first end cap is combined with a reflector and a second end cap is combined with a reflector.

The fuel sleeve assembly 300 includes a first reflector end 330 and a second reflector end 334 that prevent the fuel compacts 332 inside of the sleeve 302 from exiting the sleeve 302 during operation of a nuclear reactor. The first reflector end 330 is inserted along the longitudinal axis 301 into the first end 304 of the sleeve 302 until an exterior portion 310 rests against the first end 304. The exterior portion 310 has a narrowing portion 316 (FIG. 16) that is similar to narrowing portion 216.

The first reflector end 330 is mechanically coupled to the sleeve 302. In at least one aspect, the first reflector end 330 is mechanically coupled to the sleeve by a retention pin 314 being inserted through a hole 312 in the sleeve 302 and first reflector end 330, where the hole 312 is perpendicular to the longitudinal axis 301. For example, the hole 312 can be made in the first reflector end 330 such that upon insertion of the first reflector end 330 the hole 312 aligns with the hole 312 in the sleeve 302. A retention pin can be placed in the hole 312 to hold the first reflector end 330 in place relative to the sleeve 302. The first reflector end 330 can be mechanically coupled to the sleeve 302 through a variety of methods and the retention pin connection is one such method. Another method could be for the first reflector end 330 to screw into the first end 304 of the sleeve 302.

In at least one aspect, the second reflector end 334 inserts into the second end 306 of the sleeve 302 along the longitudinal axis 301. The second reflector end 334 is mechanically coupled to the sleeve 302 and configured to slide along the longitudinal axis 301 inside of the sleeve 302. In at least one aspect, the sleeve 302 has a slot 354 cut in the sleeve 302 along the longitudinal axis 301 and the second reflector end 334 has a hole 350 through the second reflector end 334 perpendicular to the longitudinal axis 301. A retention pin 352 can be inserted through the hole 350 and through the slot 354. In at least one aspect, the retention pin 352 is attached to the second reflector end 334. The second reflector end 334 can slide inside of the sleeve 302 the length of the slot 354. The second reflector end 334 can be mechanically coupled to the sleeve 302 through a variety of methods and the retention pin-slot connection is one such method.

Figure 19:
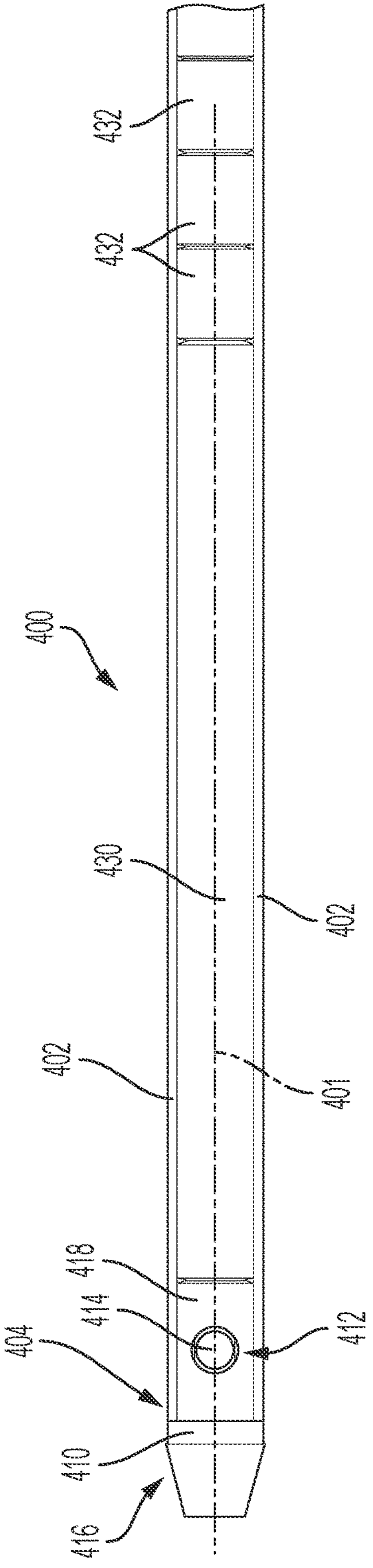
FIG. 19 is a side view of a fuel sleeve assembly, where the sleeve is transparent, according to at least one aspect of the present disclosure.
Figure 20:
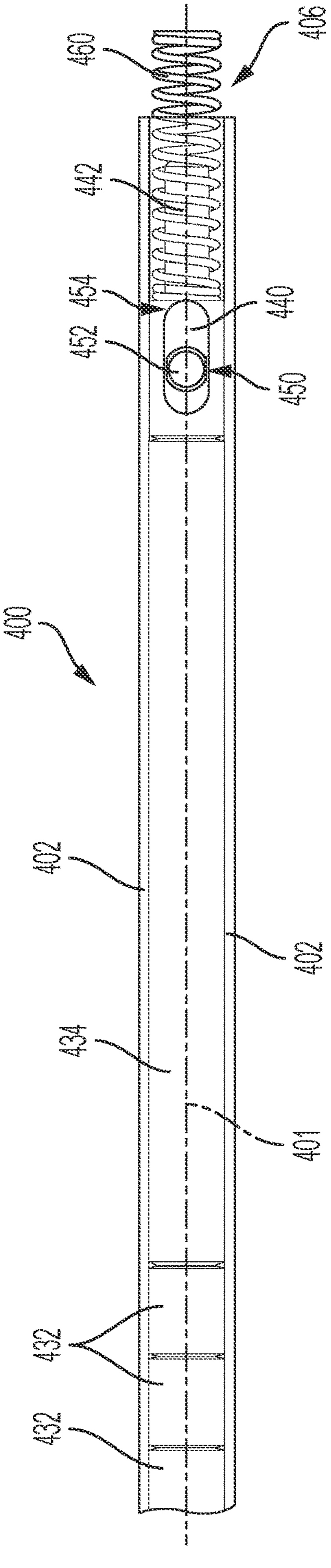
FIG. 20 is a side view of the fuel sleeve assembly of FIG. 19, according to at least one aspect of the present disclosure.
Figure 21:
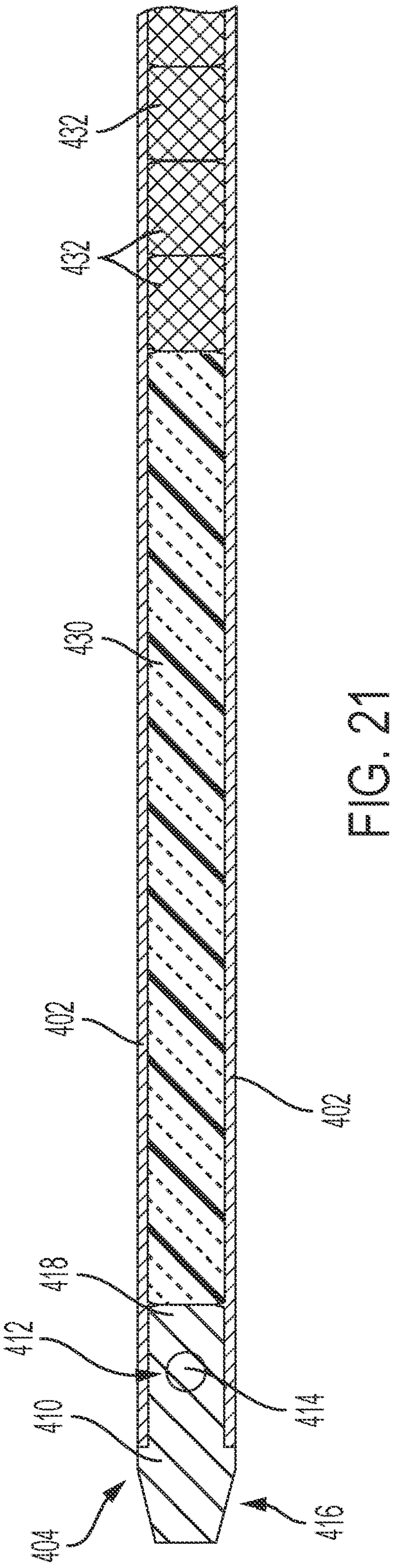
FIG. 21 is a cross-sectional view of the fuel sleeve assembly of FIG. 19, according to at least one aspect of the present disclosure.
Figure 22:
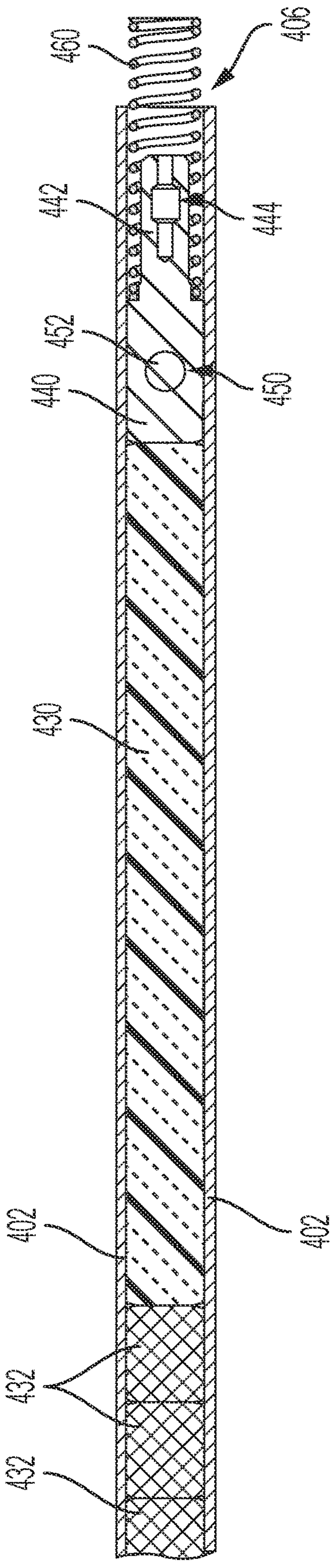
FIG. 22 is a cross-sectional view of the fuel sleeve assembly of FIG. 19, according to at least one aspect of the present disclosure.

FIGS. 19-22 illustrate fuel sleeve assembly 400. FIGS. 19 and 20 are side views and FIGS. 21 and 22 are cross-sectional views of the fuel sleeve assembly 400, all according to at least one aspect of the present disclosure. FIGS. 19 and 20 show the sleeve 402 as transparent. Fuel sleeve assembly 400 is similar in many respects to fuel sleeve assembly 200. For example, a sleeve 402, a first end 404, a second end 406, a longitudinal axis 401, a first end cap 410, a narrowing portion 416, a hole 412, a retention pin 414, an inner portion 418, a first reflector rod 430, fuel compacts 432, a second reflector rod 434, a second end cap 440, an end portion 442, an extraction tool interface feature 444, and a biasing member 460 of fuel sleeve assembly 400 function the same and are substantially similar to the sleeve 202, first end 204, second end 206, longitudinal axis 201, first end cap 210, narrowing portion 216, hole 212, retention pin 214, inner portion 218, first reflector rod 230, fuel compacts 232, second reflector rod 234, second end cap 240, end portion 242, extraction tool interface feature 244, and biasing member 260 of fuel sleeve assembly 200, respectively. For the sake of brevity, not all similar features and components will be discussed in detail. A main difference between fuel sleeve assembly 200 and fuel sleeve assembly 400 is that in fuel sleeve assembly 400 a slot 454 is cut in the sleeve 402 instead of the second end cap 440.

In at least one aspect, the second end cap 440 is configured to retain the reflector rods 430, 434 and fuel compacts 432. In at least one aspect, the second end cap 440 inserts into the second end 406 of the sleeve 402 along the longitudinal axis 401. The second end cap 440 is mechanically coupled to the sleeve 402 and configured to slide along the longitudinal axis 401 inside of the sleeve 402. In at least one aspect, the sleeve 402 has a slot 454 cut in the sleeve 402 along the longitudinal axis 401 and the second end cap 440 has a hole 450 through the second end cap 440 perpendicular to the longitudinal axis 401. A retention pin 452 can be inserted through the hole 450 and through the slot 454. In at least one aspect, the retention pin 452 is attached to the second end cap 440. The second end cap 440 can slide inside of the sleeve 402 the length of the slot 454. The second end cap 440 can be mechanically coupled to the sleeve 402 through a variety of methods and the retention pin-slot connection is one such method.

Figure 23:
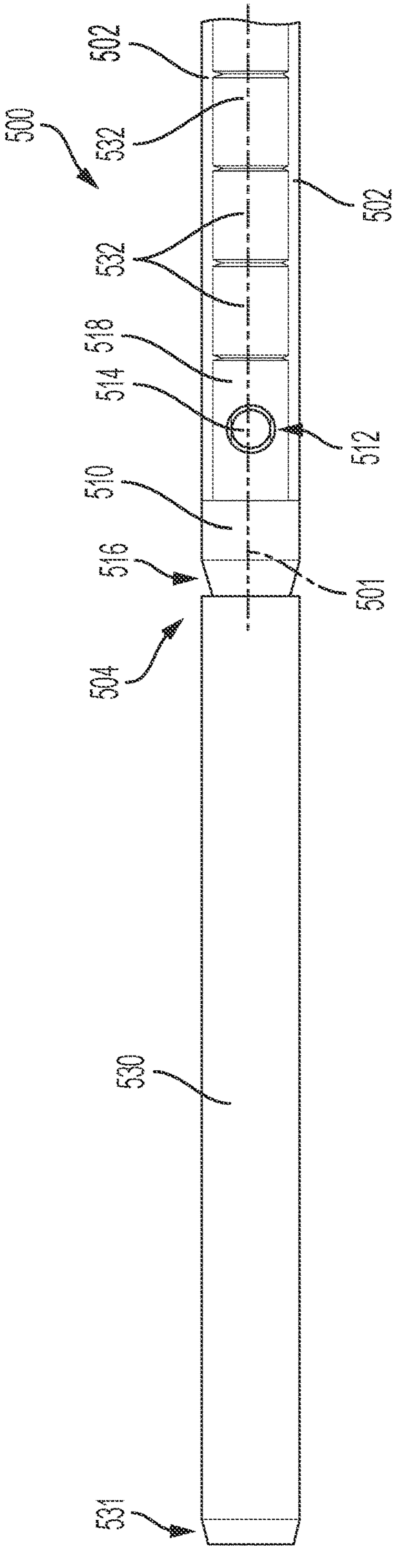
FIG. 23 is a side view of a fuel sleeve assembly, where the sleeve is transparent, according to at least one aspect of the present disclosure.
Figure 24:
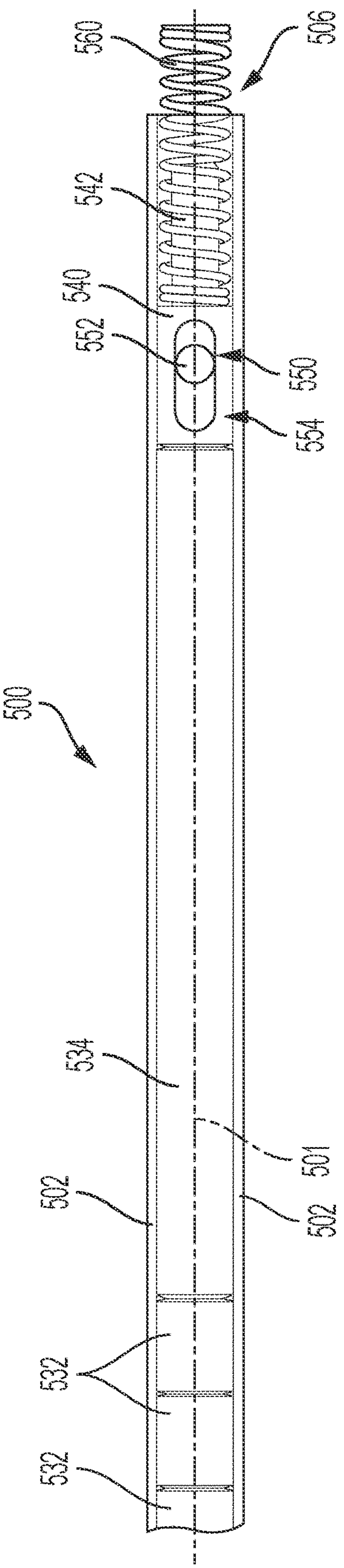
FIG. 24 is a side view of the fuel sleeve assembly of FIG. 23, according to at least one aspect of the present disclosure.
Figure 25:
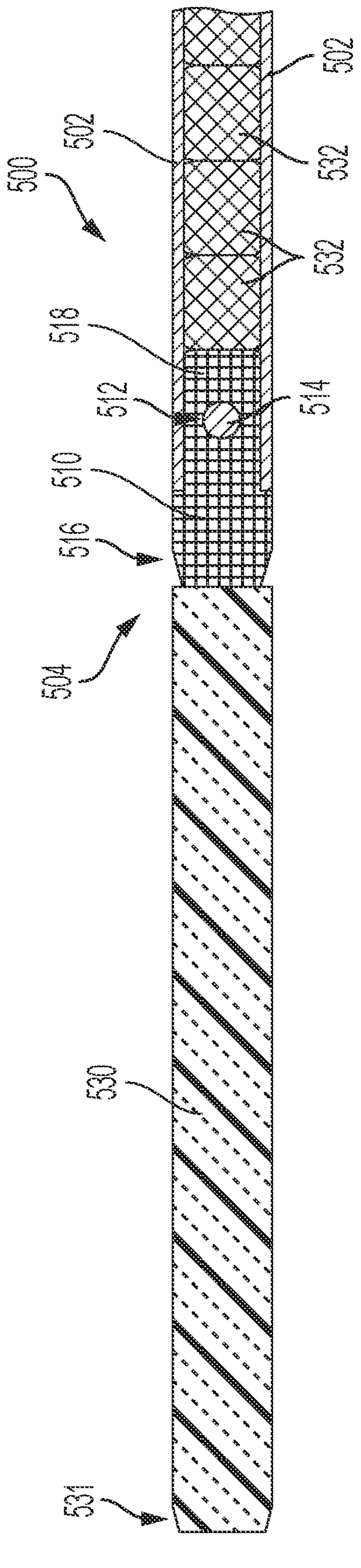
FIG. 25 is a cross-sectional view of the fuel sleeve assembly of FIG. 23, according to at least one aspect of the present disclosure.
Figure 26:
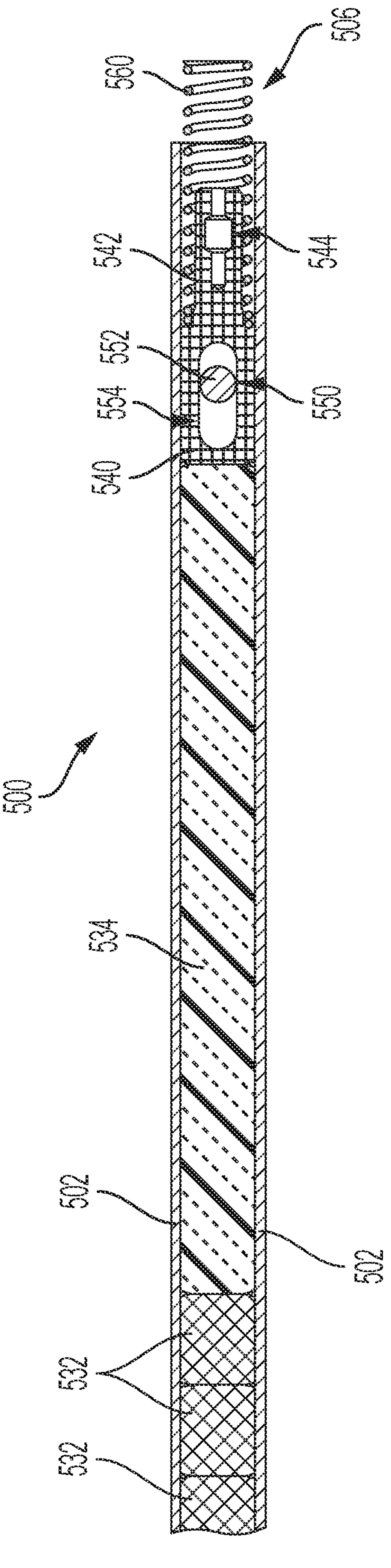
FIG. 26 is a cross-sectional view of the fuel sleeve assembly of FIG. 23, according to at least one aspect of the present disclosure.

FIGS. 23-26 illustrate fuel sleeve assembly 500. FIGS. 23 and 24 are side views and FIGS. 25 and 26 are cross-sectional views of the fuel sleeve assembly 500, all according to at least one aspect of the present disclosure. FIGS. 23 and 24 show the sleeve 502 as transparent. Fuel sleeve assembly 500 is similar in many respects to fuel sleeve assembly 200. For example, a sleeve 502, a first end 504, a second end 506, a longitudinal axis 501, a first end cap 510, a narrowing portion 516, a hole 512, a retention pin 514, first reflector rod 530, fuel compacts 532, a second reflector rod 534, a second end cap 540, an end portion 542, an extraction tool interface feature 544, a hole 550, a retention pin 552, a slot 554, and a biasing member 560 of fuel sleeve assembly 500 function the same and are substantially similar to the sleeve 202, first end 204, second end 206, longitudinal axis 201, first end cap 210, narrowing portion 216, hole 212, retention pin 214, first reflector rod 230, fuel compacts 232, second reflector rod 234, second end cap 240, end portion 242, extraction tool interface feature 244, hole 250, retention pin 252, slot 254, and biasing member 260 of fuel sleeve assembly 200, respectively. For the sake of brevity, not all similar features and components will be discussed in detail. A main difference between fuel sleeve assembly 200 and fuel sleeve assembly 500 is that in fuel sleeve assembly 500 the first reflector rod 530 is moved outside of the fuel sleeve assembly 500.

In at least one aspect, the first reflector rod 530 is inserted into the nuclear reactor fuel channel before the fuel sleeve assembly 500 is inserted. The first reflector rod 530 has a narrowing portion 531 that narrows the end of the first reflector rod 530 that is inserted into the nuclear reactor. The first end cap 510 is configured to retain the second reflector rod 534 and fuel compacts 532 inside of the sleeve 502. In at least one aspect, the inner portion 518 of the first end cap 510 is inserted into the first end 504 of the sleeve 502 along the longitudinal axis 501. The inner portion 518 rests against a fuel compact 532 of the plurality of fuel compacts 532. The first end cap 510 is mechanically coupled to the sleeve 502 similar to how the first end cap 210 is mechanically coupled to the sleeve 202.

Figure 27:
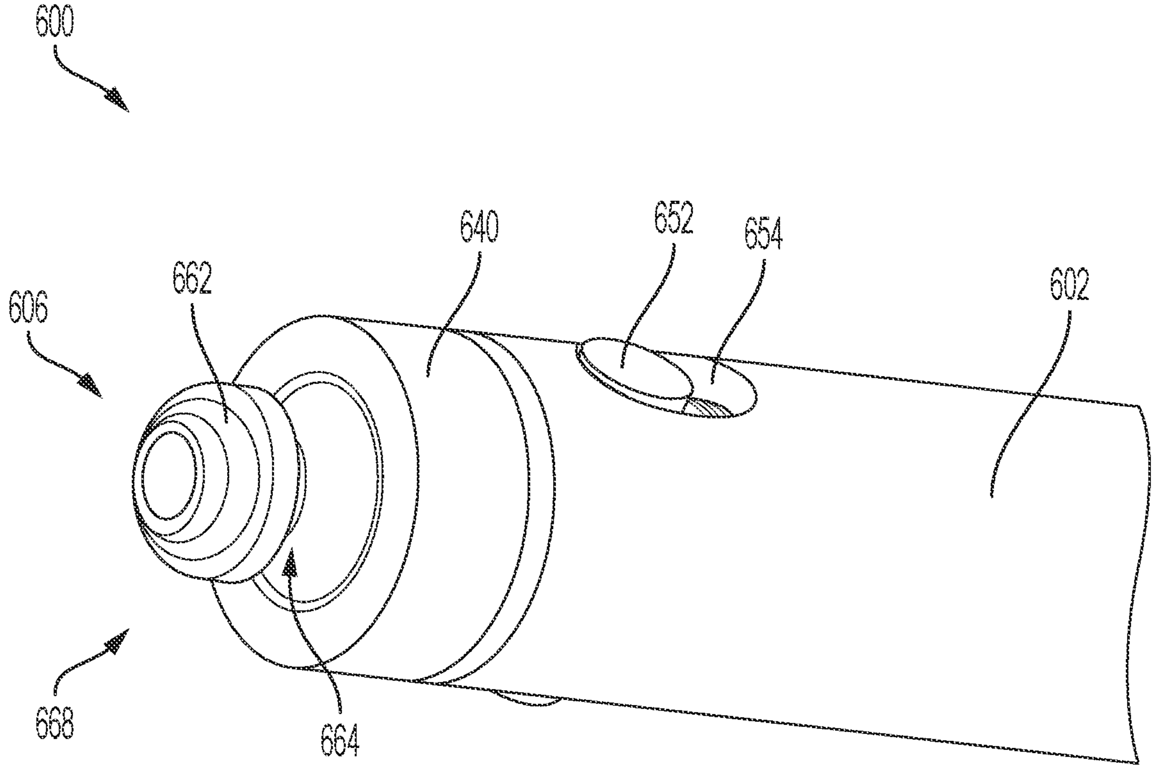
FIG. 27 is a perspective view of a fuel sleeve assembly showing an external extraction tool interface feature, according to at least one aspect of the present disclosure.
Figure 28:
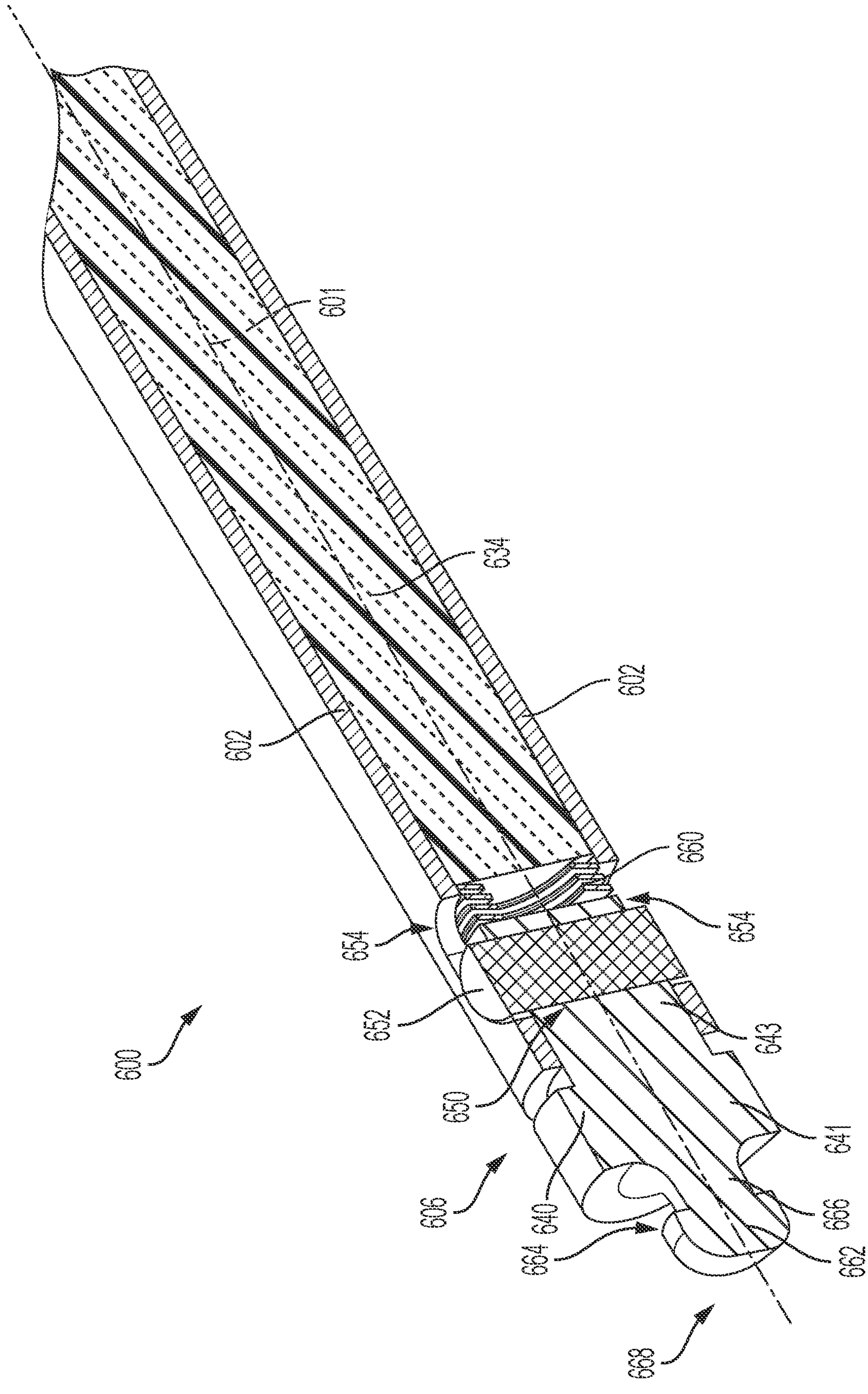
FIG. 28 is a cross-sectional view of the fuel sleeve assembly of FIG. 27, according to at least one aspect of the present disclosure.

FIGS. 27 and 28 illustrate an external extraction tool interface feature 668. FIG. 27 is a perspective view and FIG. 28 is a cross-sectional view of fuel sleeve assembly 600, according to at least one aspect of the present disclosure. The fuel sleeve assembly 600 is substantially similar to fuel sleeve assembly 200. For the sake of brevity not all of the similarities will be discussed in detail. A main difference between the fuel sleeve assembly 600 and the fuel sleeve assembly 200 is that in the fuel sleeve assembly 600 a second end cap 640 includes an external extraction tool interface feature 668.

The fuel sleeve assembly 600 includes a second end cap 640 and a first end cap (not shown) that that prevent the internal components inside of the sleeve 602 from exiting the sleeve 602 during operation of a nuclear reactor. In at least one aspect, the sleeve 602 houses and retains a second reflector rod 634, a first reflector rod, and a plurality of fuel compacts. A biasing member 660, e.g. a plenum spring, is inserted along the longitudinal axis 601 into the second end 606 of the sleeve 602 to rest against the second reflector rod 634. The second end cap 640 has an outer portion 641 that remains outside of the sleeve 602 and an inner portion 643 that is inserted along the longitudinal axis 601 into the second end 606 of the sleeve 602. Once the inner portion 643 is inserted, the inner portion 643 compresses the biasing member 660 placing the fuel sleeve assembly 600 in a compressed configuration. For example, the force applied by the biasing member 660 causes the internal components of the sleeve 602 to be compressed between the first end cap and the second end cap 640. In at least one aspect, the biasing member 660 allows the internal components of the sleeve 602 to experience axial growth, e.g. thermal and neutronic-induced axial growth, making the components expand along the longitudinal axis 601 while maintaining the structural integrity of the fuel sleeve assembly 600.

The second end cap 640 is mechanically coupled to the sleeve 602 and configured to slide along the longitudinal axis 601 inside of the sleeve 602. In at least one aspect, the sleeve 602 has a slot 654 cut in the sleeve 602 along the longitudinal axis 601 and the second end cap 640 has a hole 650 through the second end cap 640 perpendicular to the longitudinal axis 601. A retention pin 652 can be inserted through the hole 650 and through the slot 654. In at least one aspect, the retention pin 652 is attached to the second end cap 640. The second end cap 640 can slide inside of the sleeve 602 the length of the slot 654. The second end cap 640 can be mechanically coupled to the sleeve 602 through a variety of methods and the retention pin-slot connection is one such method.

Referring primarily to FIG. 28, the second end cap 640 has an external extraction tool interface feature 668 extending away from the outer portion 641 of the second end cap 640. The external extraction tool interface feature 668 has a shaft 666 that extends along the longitudinal axis away from the outer portion 641 and a button head 662. In at least one aspect, the button head 662 is rounded on a side away from the outer portion 641 and has a flat faced edge 664 on the side toward the outer portion 641. In at least one aspect, an extraction tool slides over and surrounds the button head 662 to catch the flat faced edge 664 and interface with the fuel sleeve assembly 600 to allow the extraction tool to move the entire fuel sleeve assembly 600. This process allows the extraction tool to insert a fuel sleeve assembly 600 into a nuclear reactor or remove a fuel sleeve assembly 600 from a nuclear reactor.

The external extraction tool interface feature 668 is one example of an external extraction tool interface feature. A different example could include a donut shape attached to an end of the second end cap outside of the sleeve, where the hole of the donut shape is perpendicular to the longitudinal axis 601. This would allow an extraction tool to interface with the second end cap inside of the hole. Other examples are contemplated that can be attached to the end of the second end cap and used to interface with a fuel sleeve assembly.

Figure 29:
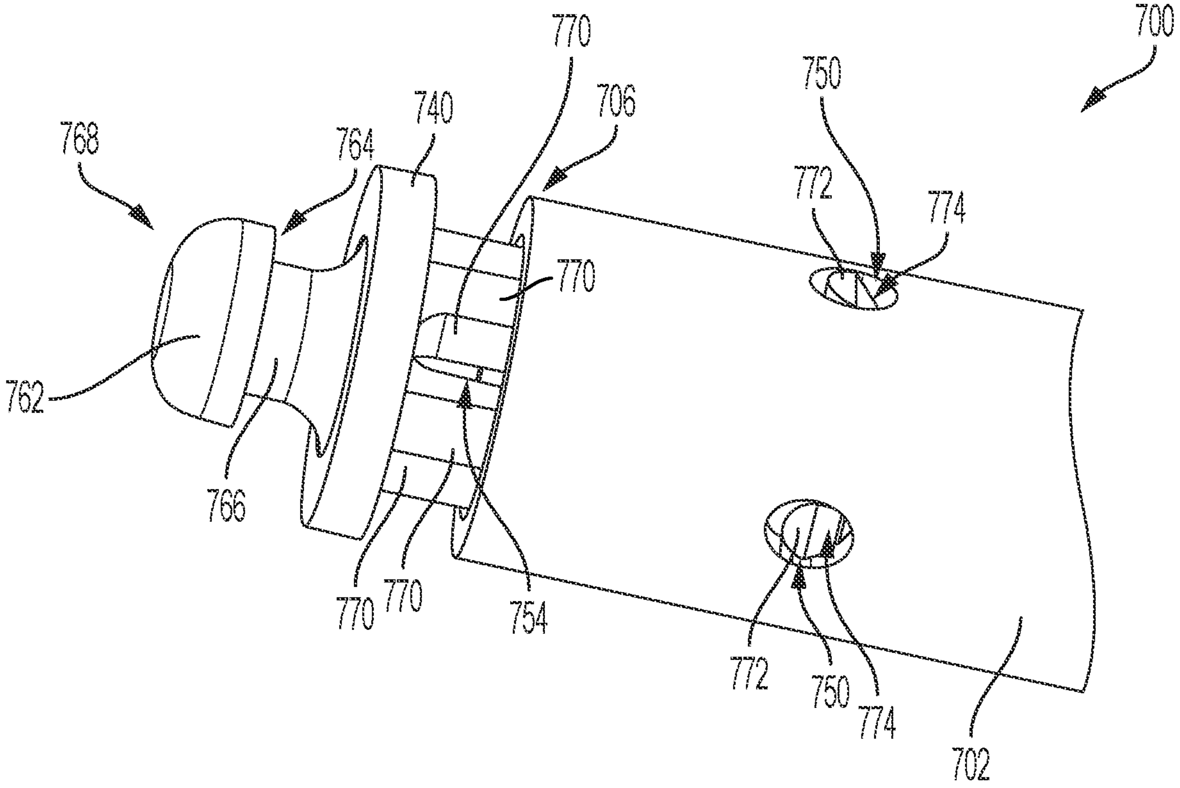
FIG. 29 is a perspective view of a fuel sleeve assembly showing an external extraction tool interface feature, according to at least one aspect of the present disclosure.
Figure 30:
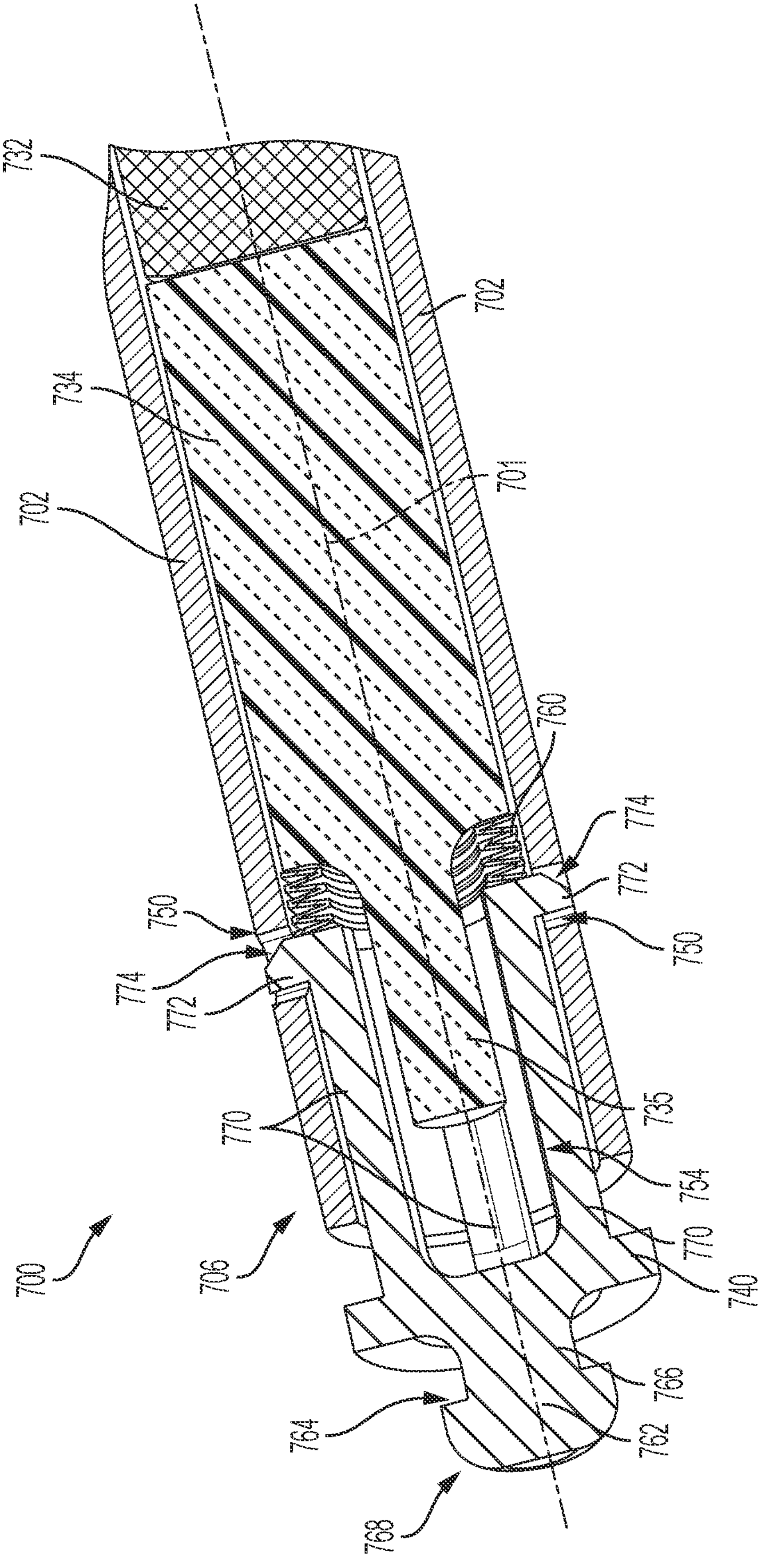
FIG. 30 is a cross-sectional view of the fuel sleeve assembly of FIG. 29, according to at least one aspect of the present disclosure.

FIGS. 29 and 30 illustrate an external extraction tool interface feature 768. FIG. 29 is a perspective view and FIG. 30 is a cross-sectional view of fuel sleeve assembly 700, according to at least one aspect of the present disclosure. The fuel sleeve assembly 700 is substantially similar to fuel sleeve assembly 600. For example, a sleeve 702, a second end 706, a longitudinal axis 701, a second reflector rod 734, a second end cap 740, a biasing member 760, a button head 762, a flat faced edge 764, a shaft 766, and an external extraction tool interface feature 768 of fuel sleeve assembly 700 function the same and are substantially similar to the sleeve 602, second end 606, longitudinal axis 601, second reflector rod 634, second end cap 640, biasing member 660, button head 662, flat faced edge 664, shaft 666, and external extraction tool interface feature 668 of fuel sleeve assembly 600, respectively. For the sake of brevity, not all similar features and components will be discussed in detail. A main difference between the fuel sleeve assembly 700 and the fuel sleeve assembly 600 is that in the fuel sleeve assembly 700 second end cap 740 has a slot 754 defined internally to the second end cap 740.

The sleeve 702 houses and retains a second reflector rod 734, a first reflector rod, and a plurality of fuel compacts 732. The biasing member 760, e.g. a plenum spring, is inserted along the longitudinal axis 701 into the second end 706 of the sleeve 702 to rest against the second reflector rod 734. In at least one aspect, the second reflector rod 734 has a protruding portion 735 that extends away from the second reflector rod 734 through the biasing member 760 toward the second end 706 of the sleeve 702.

The second end cap 740 is configured to mechanically couple to the sleeve 702. In at least one aspect, the sleeve 702 has one or more holes 750 through the sleeve 702 perpendicular to the longitudinal axis 701. In at least one aspect, the second end cap 740 has 4 internal legs 770 that define a slot 754 between them. Each internal leg 770 ends with a protrusion 772 extending radially outward from the internal leg 770. The protrusion 772 has a narrowing portion 774 that narrows the end of the internal leg 770 that is away from the second end cap 740. In at least one aspect, the narrowing portion 774 of the internal legs 770 allow the internal legs 770 to more easily enter the second end 706 of the sleeve 702 along the longitudinal axis 701. For example, the internal legs 770 can compress toward each other upon entering the sleeve 702 and the second end cap 740 moves along the longitudinal axis 701 until the protrusions 772 couple with the holes 750. In at least one aspect, the second end cap 740 is properly inserted when the protrusions 772 are mated with holes 750 in the sleeve 702. The second end cap 740 can have any number of internal legs 770 with each internal leg 770 has a protrusion that corresponds with a hole 750 in the sleeve 702.

Once the second end cap 740 is properly inserted, the internal legs 770 compress the biasing member 760 placing the fuel sleeve assembly 700 in a compressed configuration. For example, the force applied by the biasing member 760 causes the internal components of the sleeve 702 to be compressed between a first end cap (not shown) and the second end cap 740. In at least one aspect, the biasing member 760 allows the internal components of the sleeve 702 to experience axial growth, e.g. thermal and neutronic-induced axial growth, making the components expand along the longitudinal axis 701 while maintaining the structural integrity of the fuel sleeve assembly 700. In at least one aspect, when second end cap 740 is properly inserted, the protruding portion 735 of the second reflector rod 734 extends through the biasing member 760 and into the slot 754 defined in the second end cap 740.

EXAMPLES

Various aspects of the subject matter described herein are set out in the following numbered examples.

Example 1—A nuclear reactor fuel rod for use in a nuclear reactor. The nuclear reactor fuel rod comprises a sleeve defining a longitudinal axis. The sleeve comprises a first end portion and a second end portion. The nuclear reactor fuel rod further comprises a first end cap mechanically coupled to the first end portion of the sleeve and a second end cap mechanically coupled to the second end portion of the sleeve. The second end cap is configured to slide along the longitudinal axis relative to the sleeve. The nuclear reactor fuel rod further comprises a fuel compact located inside of the sleeve between the first end cap and the second end cap.

Example 2—The nuclear reactor fuel rod of Example 1, further comprising a reflector material located inside of the sleeve and between the fuel compact and the second end cap.

Example 3—The nuclear reactor fuel rod of Example 2, wherein the reflector material is a first reflector material, and wherein the nuclear reactor fuel rod further comprises a second reflector material located inside of the sleeve and between the fuel compact and the first end cap.

Example 4—The nuclear reactor fuel rod of Examples 1, 2, or 3, wherein the second end cap comprises an end cap end portion and a biasing member attached to the end cap end portion.

Example 5—The nuclear reactor fuel rod of Example 4, wherein the nuclear reactor fuel rod is transitionable from an uncompressed configuration to a compressed configuration, wherein the nuclear reactor fuel rod is in the compressed configuration inside of the nuclear reactor, and wherein in the compressed configuration the biasing member is configured to apply a force to the second end cap compressing the fuel compact.

Example 6—The nuclear reactor fuel rod of Examples 1, 2, 3, 4, or 5, wherein the sleeve comprises a slot located at the second end portion, and wherein the second end cap comprises a retention pin that is configured to slide in the slot.

Example 7—The nuclear reactor fuel rod of Examples 1, 2, 3, 4, 5, or 6, wherein the second end cap comprises a slot and a retention pin inserted through the slot, wherein the retention pin is attached to the sleeve at the second end portion, and wherein the second end cap is configured to slide relative to the sleeve.

Example 8—The nuclear reactor fuel rod of Examples 1, 2, 3, 4, 5, 6, or 7, wherein the sleeve comprises a slot running along the longitudinal axis of the sleeve from the first end to the second end.

Example 9—The nuclear reactor fuel rod of Examples 1, 2, 3, 4, 5, 6, 7, or 8, wherein the second end cap comprises an extraction tool interface feature.

Example 10—The nuclear reactor fuel rod of Example 9, wherein an extraction tool mechanically couples to the extraction tool interface feature to insert the fuel rod into the nuclear reactor or to extract the fuel rod from the nuclear reactor.

Example 11—The nuclear reactor fuel rod of Examples 9 or 10, wherein the extraction tool interface feature is defined by an internal cavity in the second end cap.

Example 12—The nuclear reactor fuel rod of Examples 9, 10, or 11, wherein the extraction tool interface feature extends outward from the second end cap.

Example 13—The nuclear reactor fuel rod of Examples 1, 2, 3, 4, 5, 6, 7, 8, 9, 10, 11, or 12, wherein the sleeve prevents direct interaction of the fuel compact with the nuclear reactor.

Example 14—A nuclear reactor fuel rod for use in a nuclear reactor. The nuclear reactor fuel rod comprises a tube defining a longitudinal axis. The tube comprises a first end portion and second end portion. The nuclear reactor fuel rod further comprises a first end cap mechanically coupled to the first end portion of the tube and a second end cap comprising an extraction tool interface feature. The second end cap is mechanically coupled to the second end portion of the tube. The second end cap is configured to move along the longitudinal axis relative to the tube. The nuclear reactor fuel rod further comprises a plurality of fuel pellets located inside of the tube between the first end cap and the second end cap.

Example 15—The nuclear reactor fuel rod of Example 14, wherein the nuclear reactor fuel rod further comprises a biasing member configured to compress the plurality of fuel pellets.

Example 16—The nuclear reactor fuel rod of Example 14, further comprising a reflector material located inside of the tube and between the plurality of fuel pellets and the second end cap.

Example 17—The nuclear reactor fuel rod of Example 16, wherein the reflector material is a first reflector material, and wherein the nuclear reactor fuel rod further comprises a second reflector material located inside of the tube and between the plurality of fuel pellets and the first end cap.

Example 18—The nuclear reactor fuel rod of Example 14, wherein the tube comprises a slot running along the longitudinal axis of the tube from the first end to the second end.

Example 19—A method of inserting nuclear fuel into a nuclear reactor using a nuclear reactor fuel rod. The method comprises coupling a first end cap of the nuclear reactor fuel rod to a first end portion of a sleeve of the nuclear reactor fuel rod, inserting fuel pellets inside the sleeve, and coupling a second end cap of the nuclear reactor fuel rod to a second end portion of the sleeve such that the fuel pellets are located in the sleeve between the first end cap and the second end cap. The method further comprises coupling an extraction tool to an extraction tool interface feature of the nuclear reactor fuel rod and placing the nuclear reactor fuel rod inside of the nuclear reactor with the extraction tool.

Example 20—The method of Example 19, further comprising moving the second end cap relative to the sleeve to compress the fuel pellets.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference and the disclosure expressly set forth in the present application controls.

The aspects described herein are understood as providing illustrative features of varying detail of various aspects of the present disclosure; and therefore, unless otherwise specified, it is to be understood that, to the extent possible, one or more features, elements, components, constituents, ingredients, structures, modules, and/or aspects of the disclosed aspects may be combined, separated, interchanged, and/or rearranged with or relative to one or more other features, elements, components, constituents, ingredients, structures, modules, and/or aspects of the disclosed aspects without departing from the scope of the present disclosure. Accordingly, it will be recognized by persons having ordinary skill in the art that various substitutions, modifications or combinations of any of the exemplary aspects may be made without departing from the scope of the invention. In addition, persons skilled in the art will recognize, or be able to ascertain using no more than routine experimentation, many equivalents to the various aspects of the present disclosure described herein upon review of this specification. Thus, the present disclosure is not limited by the description of the various aspects, but rather by the claims.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those aspects where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those aspects where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although claim recitations are presented in a sequence(s), it should be understood that the various operations may be performed in other orders than those which are described, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect,", "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

Directional phrases used herein, such as, for example and without limitation, top, bottom, left, right, lower, upper, front, back, and variations thereof, shall relate to the orientation of the elements shown in the accompanying drawing and are not limiting upon the claims unless otherwise expressly stated.

As used in any aspect herein, the term "control circuit" may refer to, for example, hardwired circuitry, programmable circuitry (e.g., a computer processor including one or more individual instruction processing cores, processing unit, processor, microcontroller, microcontroller unit, controller, digital signal processor (DSP), programmable logic device (PLD), programmable logic array (PLA), or field programmable gate array (FPGA)), state machine circuitry, firmware that stores instructions executed by programmable circuitry, and any combination thereof. The control circuit may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Accordingly, as used herein "control circuit" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

The terms "about" or "approximately" as used in the present disclosure, unless otherwise specified, means an acceptable error for a particular value as determined by one of ordinary skill in the art, which depends in part on how the value is measured or determined. In certain aspects, the term "about" or "approximately" means within 1, 2, 3, or 4 standard deviations. In certain aspects, the term "about" or "approximately" means within 50%, 200%, 105%, 100%, 9%, 8%, 7%, 6%, 5%, 4%, 3%, 2%, 1%, 0.5%, or 0.05% of a given value or range.

In this specification, unless otherwise indicated, all numerical parameters are to be understood as being prefaced and modified in all aspects by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Any numerical range recited herein includes all sub-ranges subsumed within the recited range. For example, a range of "1 to 100" includes all sub-ranges between (and including) the recited minimum value of 1 and the recited maximum value of 100, that is, having a minimum value equal to or greater than 1 and a maximum value equal to or less than 100. Also, all ranges recited herein are inclusive of the end points of the recited ranges. For example, a range of "1 to 100" includes the end points 1 and 100. Any maximum numerical limitation recited in this specification is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system that "comprises," "has," "includes" or "contains" one or more elements possesses those one or more elements, but is not limited to possessing only those one or more elements. Likewise, an element of a system, device, or apparatus that "comprises," "has," "includes" or "contains"

one or more features possesses those one or more features, but is not limited to possessing only those one or more features.

What is claimed is:

1. A nuclear reactor fuel rod for use in a nuclear reactor, the nuclear reactor fuel rod comprising:
- a sleeve defining a longitudinal axis, the sleeve comprising:
  - a first end portion; and
  - a second end portion;
- a first end cap mechanically coupled to the first end portion of the sleeve;
- a second end cap mechanically coupled to the second end portion of the sleeve, wherein the second end cap is configured to slide along the longitudinal axis relative to the sleeve during operation of the nuclear reactor; and
- a fuel compact located inside of the sleeve between the first end cap and the second end cap.

2. The nuclear reactor fuel rod of claim 1, further comprising a reflector material located inside of the sleeve and between the fuel compact and the second end cap.

3. The nuclear reactor fuel rod of claim 2, wherein the reflector material is a first reflector material, and wherein the nuclear reactor fuel rod further comprises a second reflector material located inside of the sleeve and between the fuel compact and the first end cap.

4. The nuclear reactor fuel rod of claim 1, wherein the second end cap comprises:
- an end cap end portion; and
- a biasing member attached to the end cap end portion.

5. The nuclear reactor fuel rod of claim 4, wherein the nuclear reactor fuel rod is transitionable from an uncompressed configuration to a compressed configuration, wherein the nuclear reactor fuel rod is in the compressed configuration inside of the nuclear reactor, and wherein in the compressed configuration the biasing member is configured to apply a force to the second end cap thereby compressing the fuel compact.

6. The nuclear reactor fuel rod of claim 1, wherein the sleeve comprises a slot located at the second end portion, and wherein the second end cap comprises a retention pin that is configured to slide in the slot.

7. The nuclear reactor fuel rod of claim 1, wherein the second end cap comprises:
- a slot; and
- a retention pin inserted through the slot, wherein the retention pin is attached to the sleeve at the second end portion, and wherein the second end cap is configured to slide relative to the sleeve.

8. The nuclear reactor fuel rod of claim 1, wherein the sleeve comprises a slot running along the longitudinal axis of the sleeve from the first end to the second end.

9. The nuclear reactor fuel rod of claim 1, wherein the second end cap comprises an extraction tool interface feature.

10. The nuclear reactor fuel rod of claim 9, wherein the extraction tool interface feature is configured to mechanically couple to an extraction tool to insert the fuel rod into the nuclear reactor or to extract the fuel rod from the nuclear reactor.

11. The nuclear reactor fuel rod of claim 9, wherein the extraction tool interface feature is defined by an internal cavity in the second end cap.

12. The nuclear reactor fuel rod of claim 9, wherein the extraction tool interface feature extends outward from the second end cap.

13. A nuclear reactor fuel rod for use in a nuclear reactor, the nuclear reactor fuel rod comprising:
- a tube defining a longitudinal axis, the tube comprising:
  - a first end portion; and
  - a second end portion;
- a first end cap mechanically coupled to the first end portion of the tube;
- a second end cap comprising an extraction tool interface feature, wherein the second end cap is mechanically coupled to the second end portion of the tube, and wherein the second end cap is configured to move along the longitudinal axis relative to the tube during operation of the nuclear reactor; and
- a plurality of fuel pellets located inside of the tube between the first end cap and the second end cap.

14. The nuclear reactor fuel rod of claim 13, wherein the nuclear reactor fuel rod further comprises a biasing member configured to compress the plurality of fuel pellets.

15. The nuclear reactor fuel rod of claim 13, further comprising a reflector material located inside of the tube and between the plurality of fuel pellets and the second end cap.

16. The nuclear reactor fuel rod of claim 15, wherein the reflector material is a first reflector material, and wherein the nuclear reactor fuel rod further comprises a second reflector material located inside of the tube and between the plurality of fuel pellets and the first end cap.

17. The nuclear reactor fuel rod of claim 13, wherein the tube comprises a slot running along the longitudinal axis of the tube from the first end to the second end.

* * * * *